US012061836B2

(12) United States Patent  
Yamauchi et al.

(10) Patent No.: US 12,061,836 B2  
(45) Date of Patent: Aug. 13, 2024

(54) INFORMATION PROVIDING METHOD AND CONTROL METHOD OF AUDIO DEVICE

(71) Applicant: Panasonic Intellectual Property Corporation of America, Torrance, CA (US)

(72) Inventors: Masaki Yamauchi, San Jose, CA (US); Nanami Fujiwara, Santa Clara, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 554 days.

(21) Appl. No.: 17/218,557

(22) Filed: Mar. 31, 2021

(65) Prior Publication Data

US 2021/0349679 A1 Nov. 11, 2021

Related U.S. Application Data

(63) Continuation of application No. PCT/JP2019/038852, filed on Oct. 2, 2019.
(Continued)

(30) Foreign Application Priority Data

Jul. 9, 2019 (JP) ................................. 2019-127986

(51) Int. Cl.
*G06F 3/16* (2006.01)
*G05B 15/02* (2006.01)

(52) U.S. Cl.
CPC ............. *G06F 3/165* (2013.01); *G05B 15/02* (2013.01)

(58) Field of Classification Search
CPC ... G06F 3/167; G06F 16/27; H04R 2227/005; H04L 65/60; H04L 67/535; H04L 12/2803
(Continued)

(56) References Cited

U.S. PATENT DOCUMENTS 9,747,554 B2 * 8/2017 Canoy ..................... G06N 20/00
2011/0173323 A1 * 7/2011 Fimbel ..................... H04L 67/12
709/224

(Continued)

FOREIGN PATENT DOCUMENTS

CN 106205022 12/2016
JP 2018-32272 3/2018

OTHER PUBLICATIONS

International Search Report issued Dec. 24, 2019 in International (PCT) Application No. PCT/JP2019/038852.
(Continued)

*Primary Examiner* — Alexander Krzystan
(74) *Attorney, Agent, or Firm* — Wenderoth, Lind & Ponack, L.L.P.

(57) ABSTRACT

An information providing method that, when (i) presence information indicates that a user is present in a space, (ii) current lighting information indicates that a luminaire is currently emitting light, (iii) the current time is not included in a period indicated in past lighting information, and (iv) operating status information indicates that an audio device is not outputting sound, generates first information indicating that a user is in a space at a time at which the user is not usually in the space, obtains, from a second information processing apparatus connected to a first information processing apparatus, information indicating first request content over a network, and, when content of the first information is included in the first request content, outputs, to the second information processing apparatus, second informa-
(Continued)

tion including information for identifying a user or space, using the first information.

8 Claims, 32 Drawing Sheets

Related U.S. Application Data

(60) Provisional application No. 62/740,041, filed on Oct. 2, 2018, provisional application No. 62/740,077, filed on Oct. 2, 2018.

(58) Field of Classification Search
USPC .......................................................... 700/94
See application file for complete search history.

(56) References Cited

U.S. PATENT DOCUMENTS

| | | | |
|---|---|---|---|
| 2013/0214898 A1* | 8/2013 | Pineau .................. | H04W 4/023 340/5.6 |
| 2014/0349269 A1 | 11/2014 | Canoy et al. | |
| 2016/0134932 A1* | 5/2016 | Karp ..................... | H04L 67/125 348/207.11 |
| 2016/0261425 A1* | 9/2016 | Horton ................. | H04L 67/1097 |
| 2017/0033944 A1* | 2/2017 | Nadathur ............. | H04L 41/0695 |
| 2017/0108236 A1* | 4/2017 | Guan .................... | G05B 19/042 |
| 2017/0243581 A1* | 8/2017 | Mozer ................... | G06V 40/16 |

OTHER PUBLICATIONS

Office Action issued Mar. 15, 2024 in Chinese Application No. 201980064846.2 (with partial English translation).

* cited by examiner

FIG. 5A

Living room

| Period | 0:00-1:00 | ... | 6:00-7:00 | 7:00-8:00 | ... | 23:00-24:00 |
|---|---|---|---|---|---|---|
| Probability | 10% | | 28.5% | 85% | | 100% |

FIG. 5B

Kitchen

| Period | 0:00-1:00 | ... | 6:00-7:00 | 7:00-8:00 | ... | 23:00-24:00 |
|---|---|---|---|---|---|---|
| Probability | 10% | | 10% | 95% | | 100% |

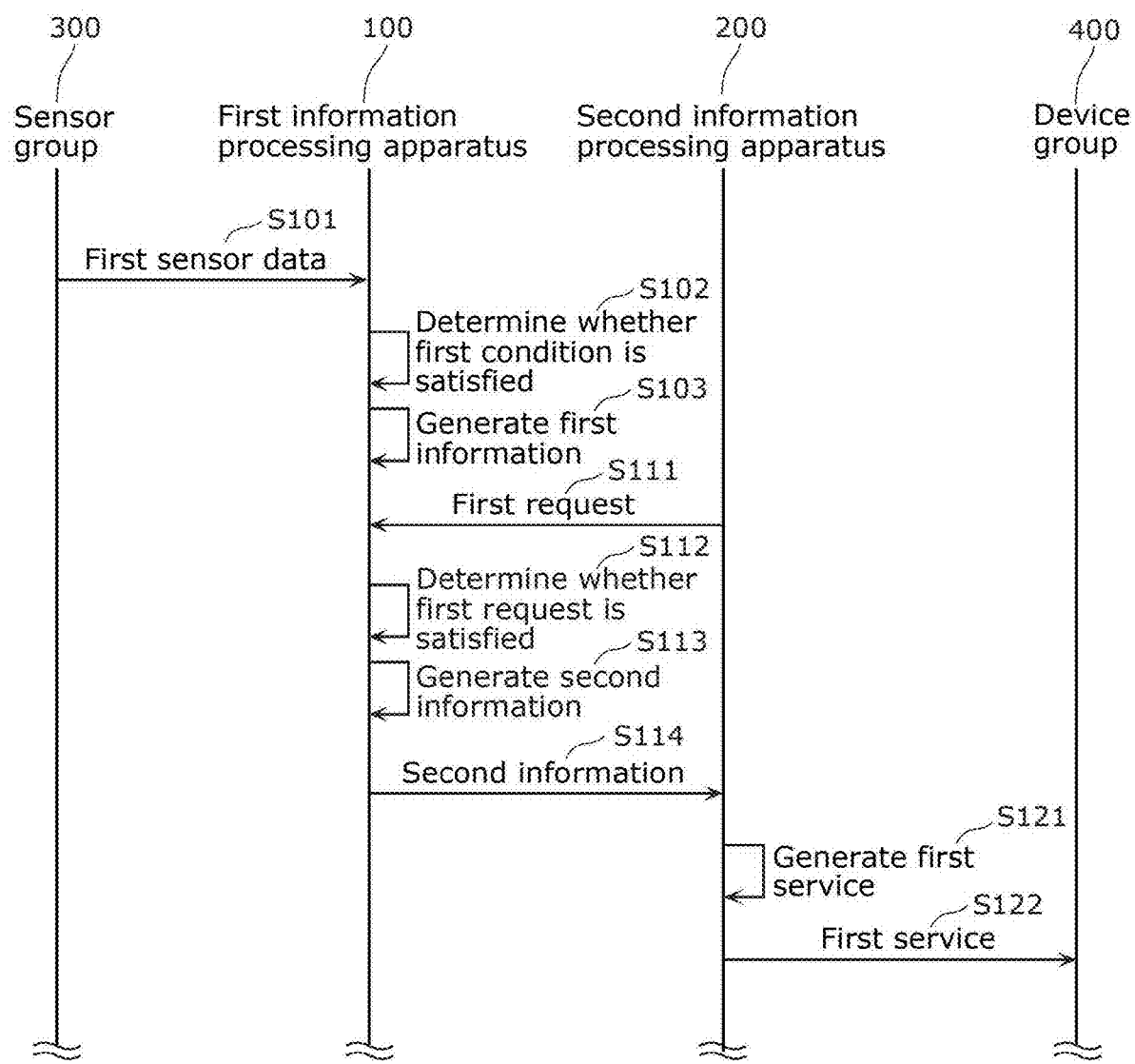

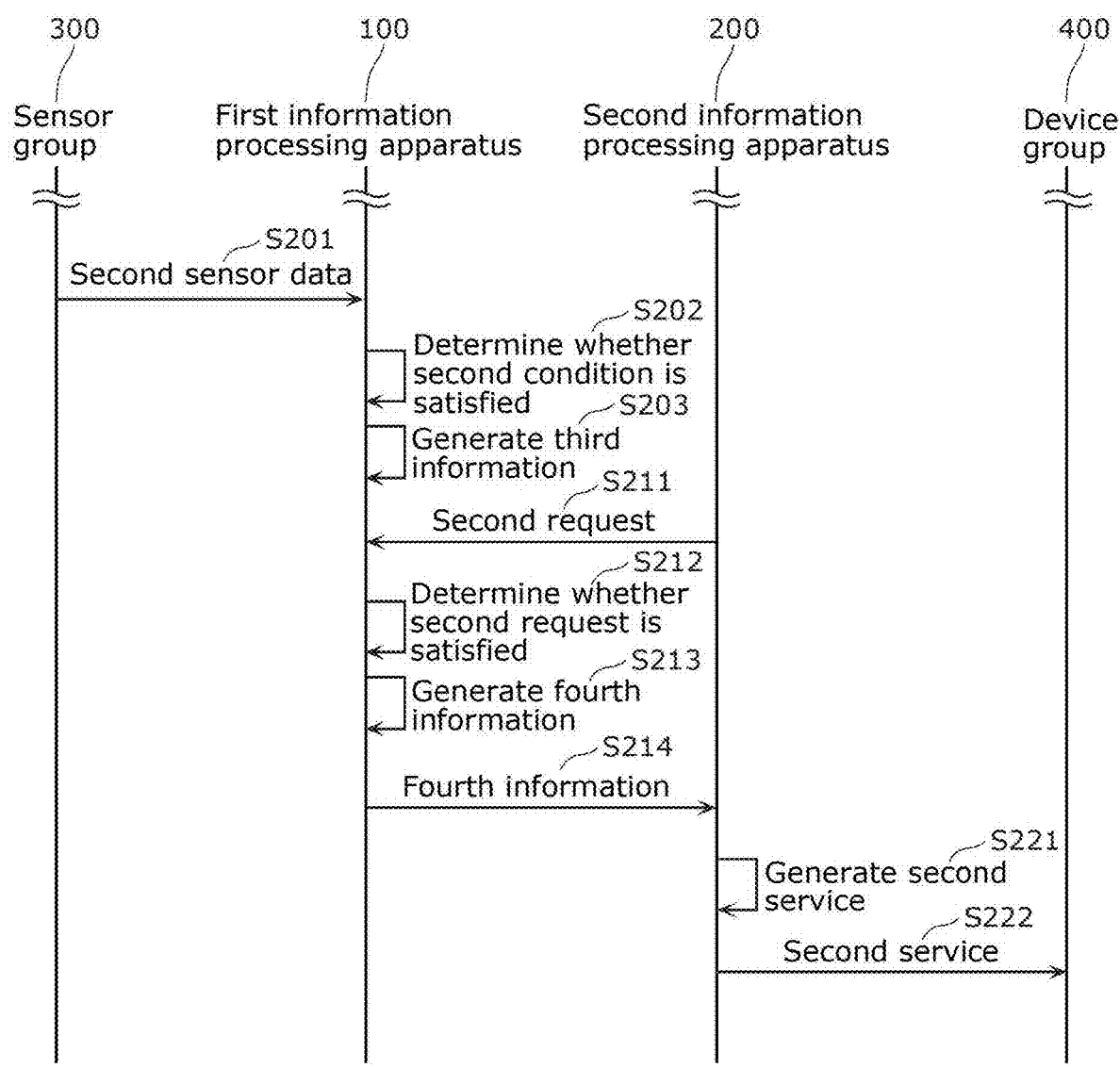

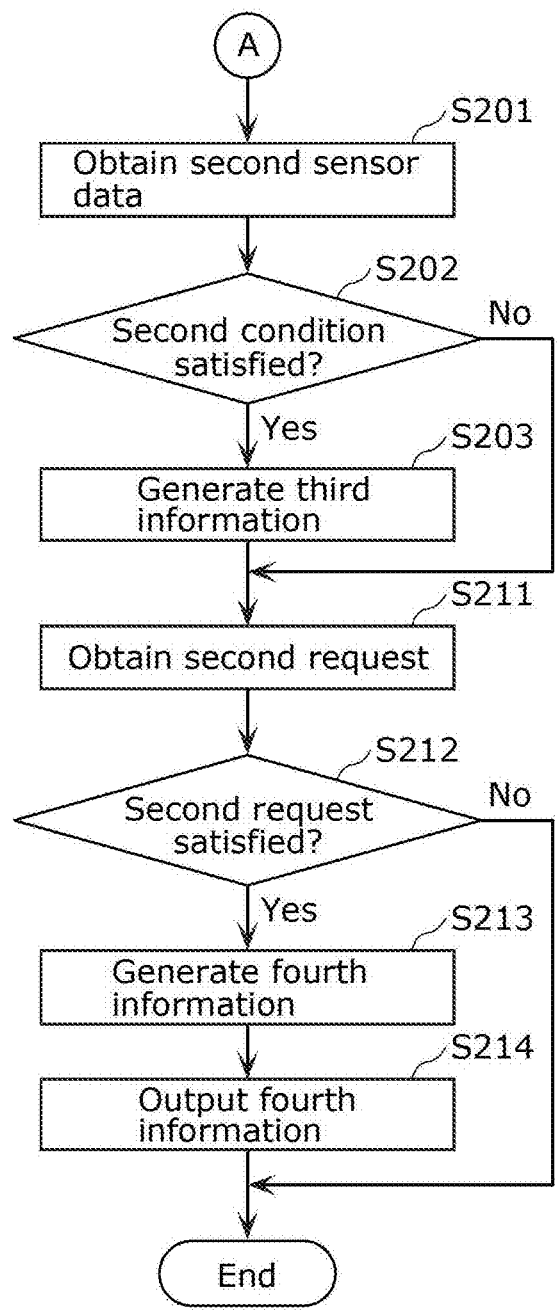

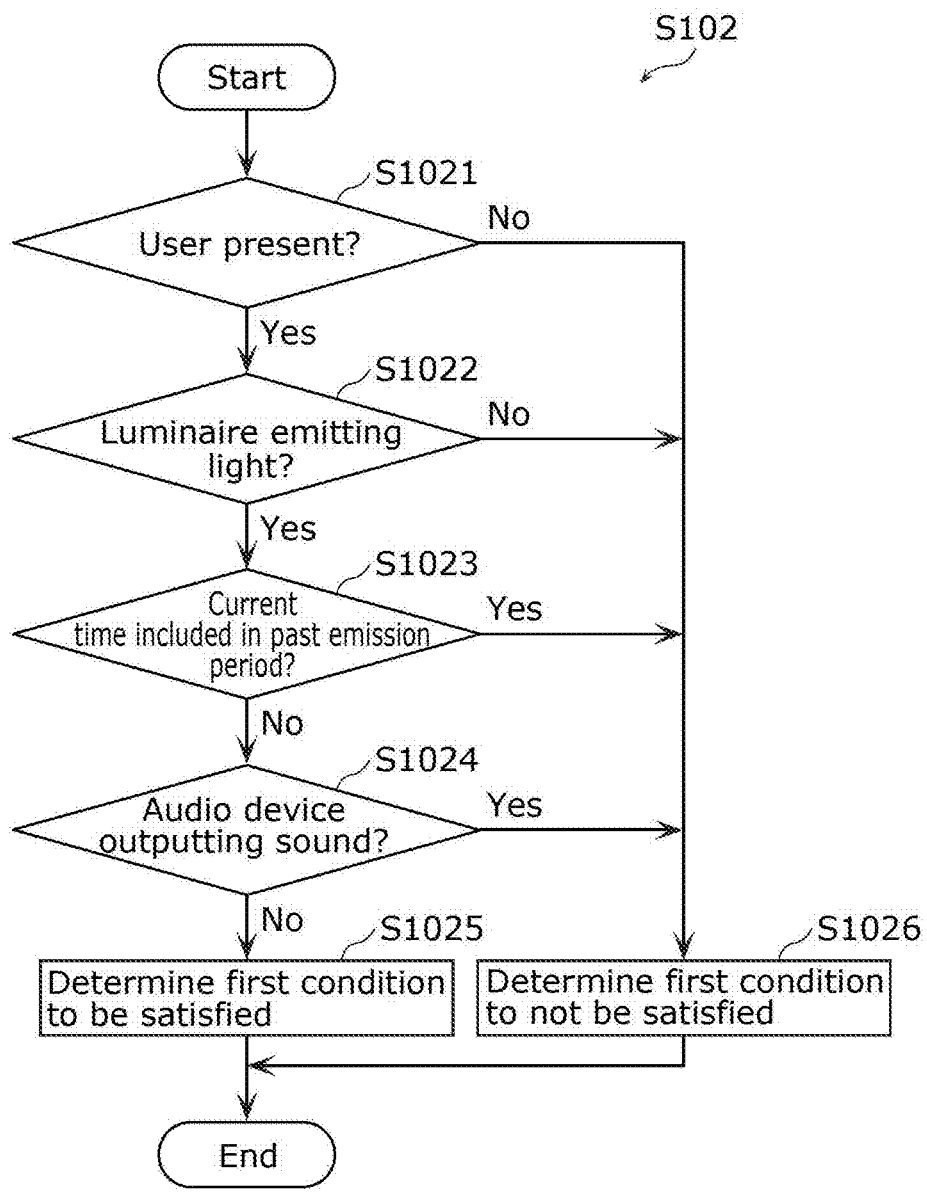

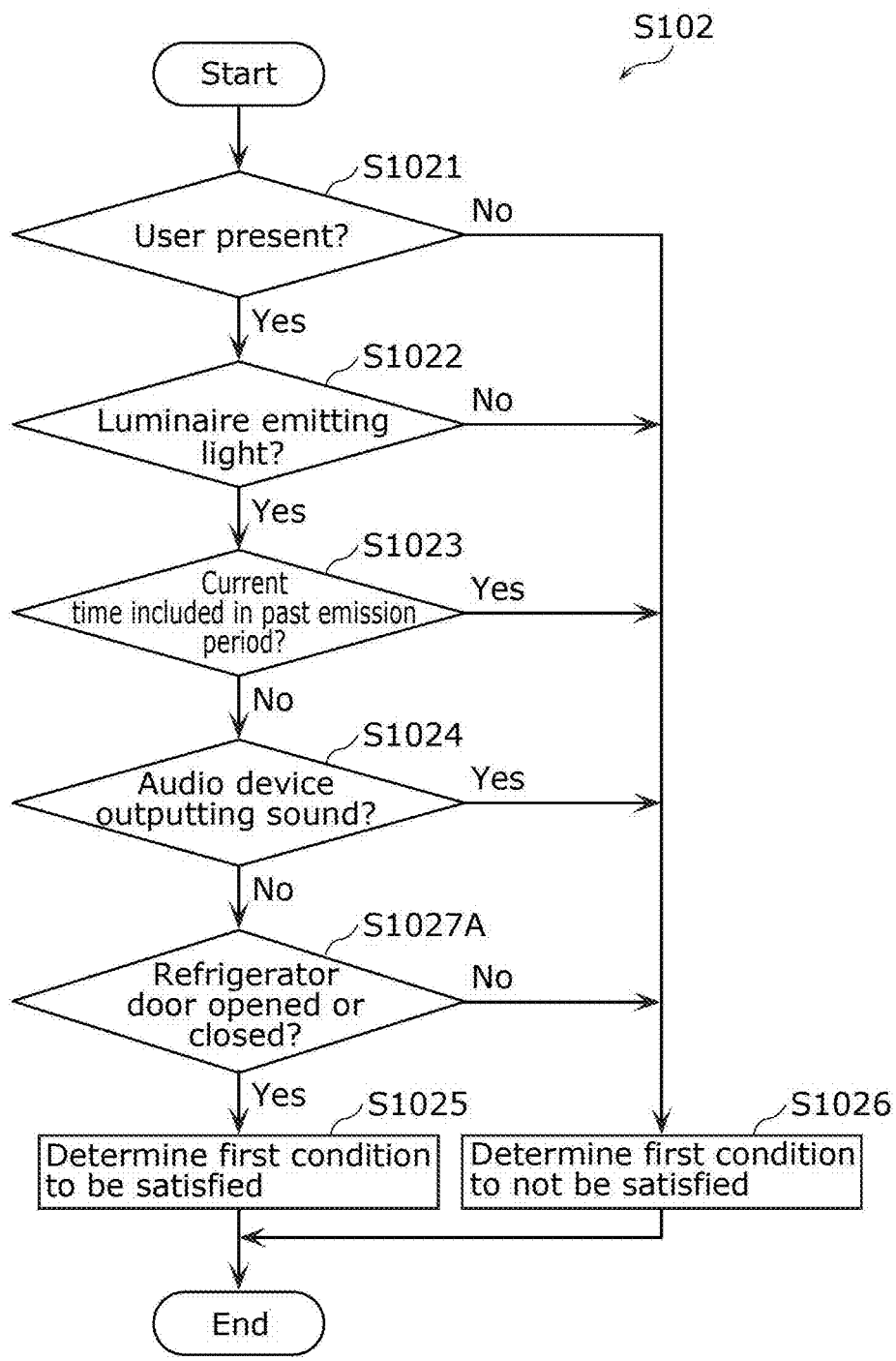

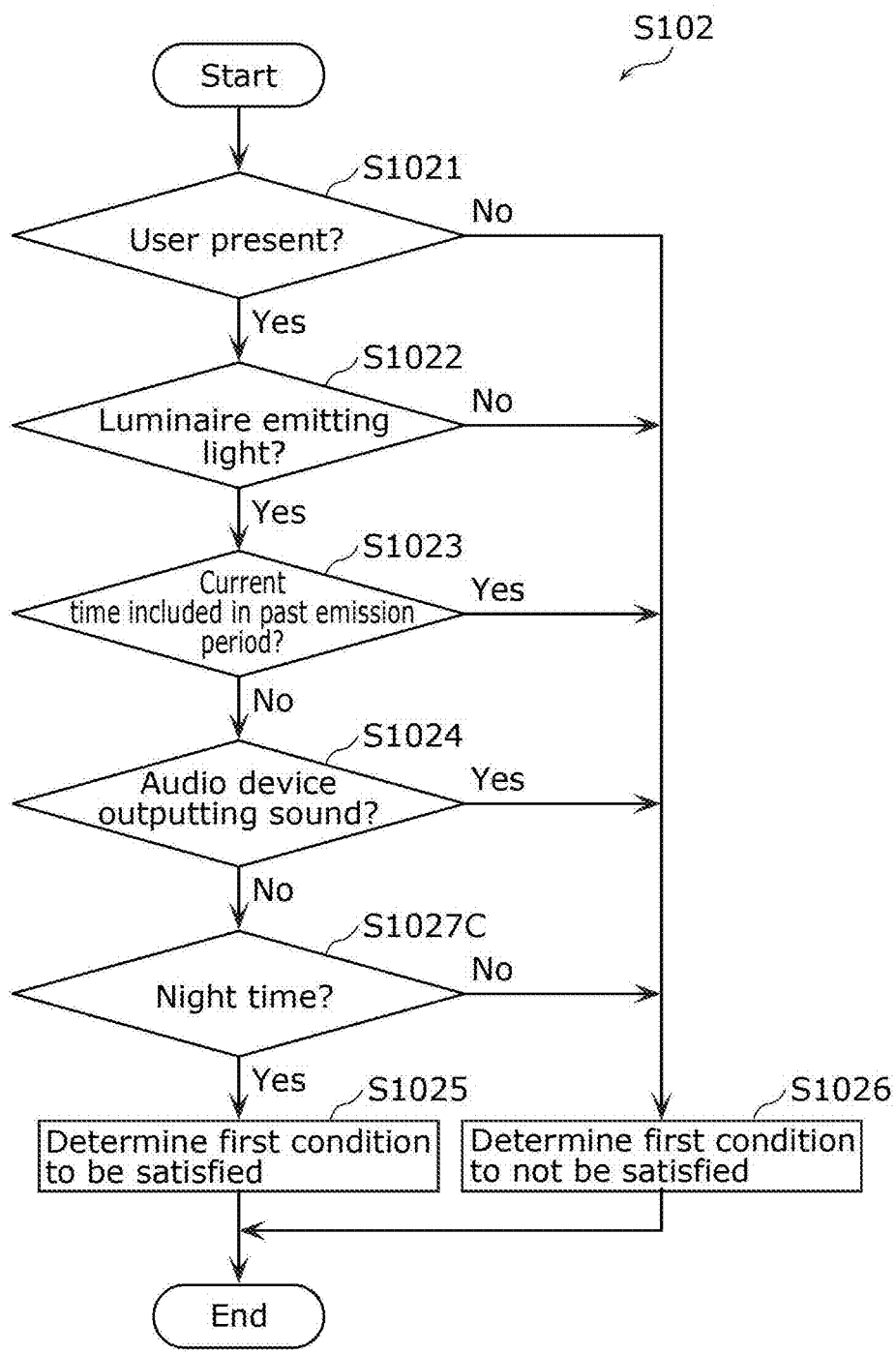

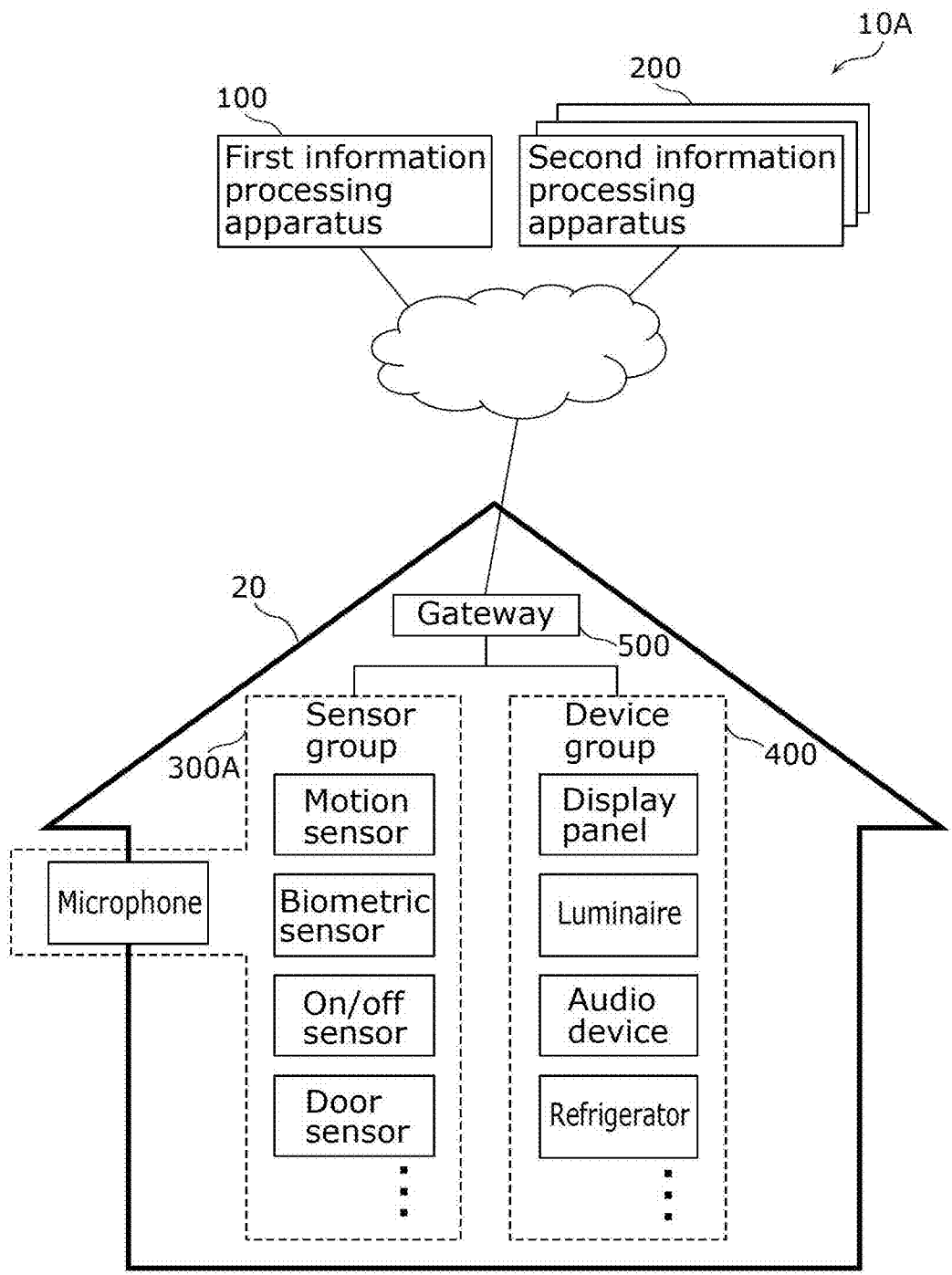

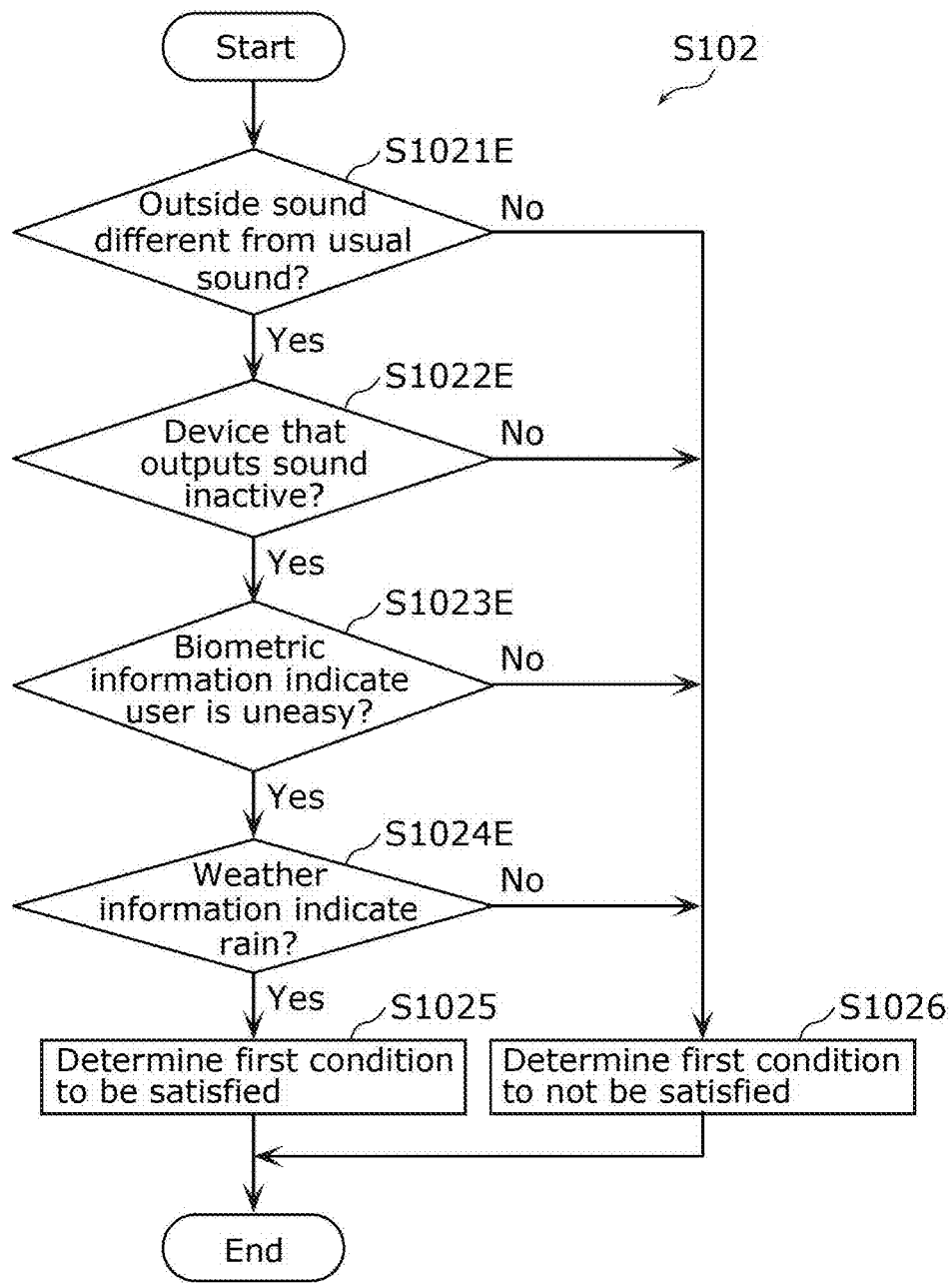

| Device | Activity status |
|---|---|
| Television | ✓ |
| Speaker | — |
| Personal computer | — |
| Washing machine | — |
| Vacuum cleaner | — |
| ... | |

| Date | Forecast |
|---|---|
| 2018.6.1 | Clear |
| 2018.6.2 | Rain |
| 2018.6.3 | Cloudy |
| 2018.6.4 | Rain |
| 2018.6.5 | Clear |
| 2018.6.6 | Cloudy |
| 2018.6.7 | Cloudy |

Current date

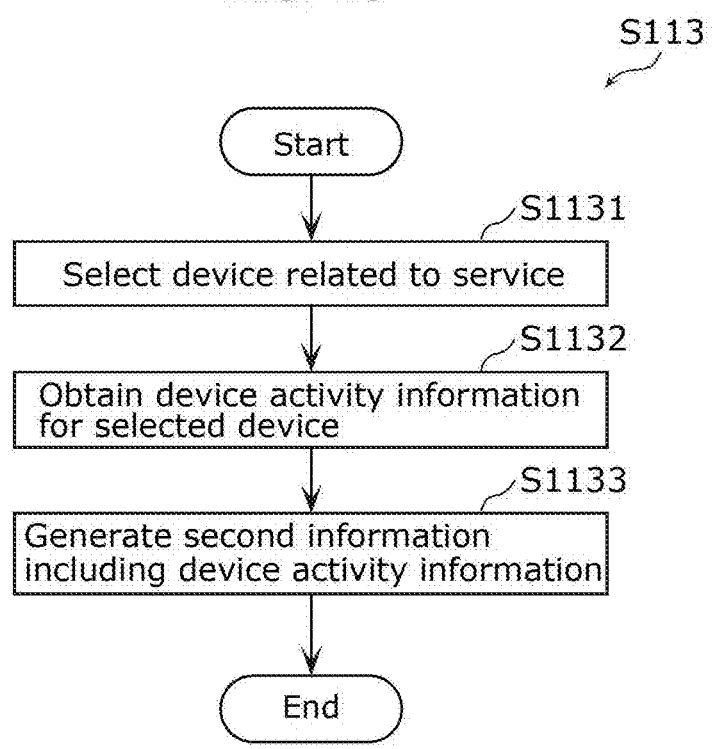

FIG. 19A

|  | Service 1 | Service 2 | ... |
|---|---|---|---|
| Sight | ✓ | — |  |
| Hearing | ✓ | — |  |
| Smell | — | ✓ |  |
| Touch (back, waist) | — | — |  |
| Touch (eyes) | — | — |  |

FIG. 19B

|  | Television | Speaker | Aroma diffuser | Massage chair | Eye massager | ... |
|---|---|---|---|---|---|---|
| Sight | ✓ | — | — | — | — |  |
| Hearing | ✓ | ✓ | — | — | — |  |
| Smell | — | — | ✓ | — | — |  |
| Touch (back, waist) | — | — | — | ✓ | — |  |
| Touch (eyes) | — | — | — | — | ✓ |  |

FIG. 22A

|  | Number of times service can be provided per day | Situations in which service cannot be provided | ... |
|---|---|---|---|
| Service 1 | No restriction | User situation A |  |
| Service 2 | Once a day | User situation B |  |
| Service 3 | No restriction | — |  |
| ... |  |  |  |

FIG. 22B

|  | Service 1 | Service 2 | Service 3 | ... |
|---|---|---|---|---|
| Service 1 |  | — | — |  |
| Service 2 | — |  | ✓ |  |
| Service 3 | — | ✓ |  |  |
| ... |  |  |  |  |

FIG. 22C

|  | Service 1 | Service 2 | Service 3 | ... |
|---|---|---|---|---|
| Service 1 |  | ✓ | — |  |
| Service 2 | — |  | ✓ |  |
| Service 3 | — | — |  |  |
| ... |  |  |  |  |

INFORMATION PROVIDING METHOD AND CONTROL METHOD OF AUDIO DEVICE

CROSS REFERENCE TO RELATED APPLICATIONS

This is a continuation application of PCT International Application No. PCT/JP2019/038852 filed on Oct. 2, 2019, designating the United States of America, which is based on and claims priority of U.S. Provisional Patent Application No. 62/740,041 filed on Oct. 2, 2018, U.S. Provisional Patent Application No, 62/740,077 filed on Oct. 2, 2018, and Japanese Patent Application No. 2019-127986 filed on Jul. 9, 2019. The entire disclosures of the above-identified applications, including the specifications, drawings, and claims are incorporated herein by reference in their entirety.

FIELD

The present disclosure relates to an information providing method, a control method of an audio device, and an information processing apparatus.

BACKGROUND

In recent years it has become possible to collect a large amount of sensor data from sensors placed in various places, and thus there is a demand to effectively use the collected sensor data. For example, if sensor data from various sensors placed in an indoor space such as a house is used, it is possible to provide services suitable to the user's situation (for example, see Japanese Patent Application Publication No. 2018-32272).

SUMMARY

Technical Problem

However, with the conventional art, there is little information that is related to how to use the sensor data, and it is therefore difficult to effectively use the sensor data for providing services.

The present disclosure provides, for example, an information providing method that can effectively use sensor data for providing services.

Solutions to Problem

An information providing method according to one aspect of the present disclosure is a method that uses a first information processing apparatus which includes a processor and memory. A luminaire, an audio device that outputs sound, and a sensor are disposed in a space. The processor, in operation: obtains presence information indicating whether a user is present in the space, based on a first sensor value of the sensor; obtains past lighting information indicating a period in the past in which the luminaire emitted light; obtains current lighting information indicating whether the luminaire is currently emitting light; obtains operating status information indicating whether the audio device is outputting sound; when (i) the presence information indicates that the user is present in the space, (ii) the current lighting information indicates that the luminaire is currently emitting light, (iii) a current time is not included in a period indicated in the past lighting information, and (iv) the operating status information indicates that the audio device is not outputting sound, generates first information indicating that the user is in the space at a time at which the user is not usually in the space; obtains, from a second information processing apparatus connected to the first information processing apparatus, information indicating first request content over a network; and when content of the first information is included in the first request content, outputs, to the second information processing apparatus, second information including information for identifying the user or the space, using the first information.

An information providing method according to one aspect of the present disclosure is a method that uses a first information processing apparatus which includes a processor and memory. A device is disposed in a space. The processor: obtains past user-operation information indicating an operation period in which the device was operated in the past; obtains current user-operation information indicating whether the device was operated within a given period from a current time; when (viii) the current user-operation information indicates that the device was operated within the given period from the current time and (ix) the current time is not included in an operation period indicated in the past user-operation information, generates first information indicating that a user is in the space at a time at which the user is not usually in the space; obtains, from a second information processing apparatus connected to the first information processing apparatus, information indicating first request content over a network; and when content of the first information is included in the first request content, outputs, to the second information processing apparatus, second information including information for identifying the user or the space, using the first information.

A control method according to one aspect of the present disclosure is a control method of an audio device that uses an information processing apparatus including a processor and memory. A luminaire, an audio device that outputs sound, and a sensor are disposed in a space. The processor: obtains presence information indicating whether a user is present in the space, based on a first sensor value of the sensor; obtains past lighting information indicating a period in the past in which the luminaire emitted light; obtains current lighting information indicating whether the luminaire is currently emitting light; obtains operating status information indicating whether the audio device is outputting sound; and when (i) the presence information indicates that the user is present in the space, (ii) the current lighting information indicates that the luminaire is currently emitting light, (iii) a current time is not included in a period indicated in the past lighting information, and (iv) the operating status information indicates that the audio device is not outputting sound, causes the audio device to output a given piece of music.

An information providing method according to one aspect of the present disclosure is a method that uses a first information processing apparatus which includes a processor and memory. A microphone is disposed outside a home. The processor: obtains information indicating current sound outside the home obtained by the microphone; (x) when the information indicating current sound outside the home indicates sound that is different from usual sound outside the home, generates first information indicating that a user feels uneasy about the sound outside the home; obtains, from a second information processing apparatus connected to the first information processing apparatus, information indicating first request content over a network; and when content of the first information is included in the first request content, outputs, to the second information processing apparatus, second information including information for identifying the user or the home, using the first information.

General and specific aspect(s) disclosed above may be implemented using a system, an apparatus, an integrated circuit, a computer program, or a computer-readable recording medium such as a CD-ROM, or any combination thereof.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The information providing method according to one aspect of the present disclosure can effectively use sensor data for providing services.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5A illustrates one example of past lighting information according to Embodiment 1.

FIG. 5B illustrates one example of past lighting information according to Embodiment 1.

FIG. 6 is a sequence diagram for the service providing system according to Embodiment 1.

FIG. 7 is a sequence diagram for the service providing system according to Embodiment 1.

FIG. 9 is a flow chart illustrating processes performed by the first information processing apparatus according to Embodiment 1.

FIG. 10 is a flow chart illustrating one example of the determination process for the first condition according to Embodiment 1.

FIG. 11A is a flow chart illustrating another example of the determination process for the first condition according to Embodiment 1.

FIG. 11C is a flow chart illustrating another example of the determination process for the first condition according to Embodiment 1.

FIG. 13 illustrates the configuration of the service providing system according to Embodiment 2.

FIG. 14 is a flow chart illustrating one example of the determination process for the first condition according to Embodiment 2.

FIG. 18 is a flow chart illustrating one example of the process for generating the second information according to Variation 3 of Embodiments 1 and 2.

FIG. 19A illustrates one example of relationships between services and the five senses according to Variation 3 of Embodiments 1 and 2.

FIG. 19B illustrates one example of relationships between devices and the five senses according to Variation 3 of Embodiments 1 and 2.

FIG. 22A illustrates one example of the service provision availability information according to Variation 4 of Embodiments 1 and 2.

FIG. 22B illustrates one example of information indicating services that are prohibited from being provided simultaneously according to Variation 4 of Embodiments 1 and 2.

FIG. 22C illustrates one example of information indicating services that are prohibited from being changed according to Variation 4 of Embodiments 1 and 2.

DESCRIPTION OF EMBODIMENTS

Hereinafter, embodiments are specifically described with reference to the drawings.

Each of the following embodiments describes a general or specific example, The numerical values, shapes, materials, elements, the arrangement and connection of the elements, steps, order of the steps, etc., shown in the following embodiments are mere examples, and therefore do not limit the scope of the claims.

The figures are not necessarily precise illustrations, In the figures, elements that are essentially the same share like reference signs. Accordingly, duplicate description thereof is omitted or simplified.

Embodiment 1

Overview of Service Providing System 10

Figure 1:
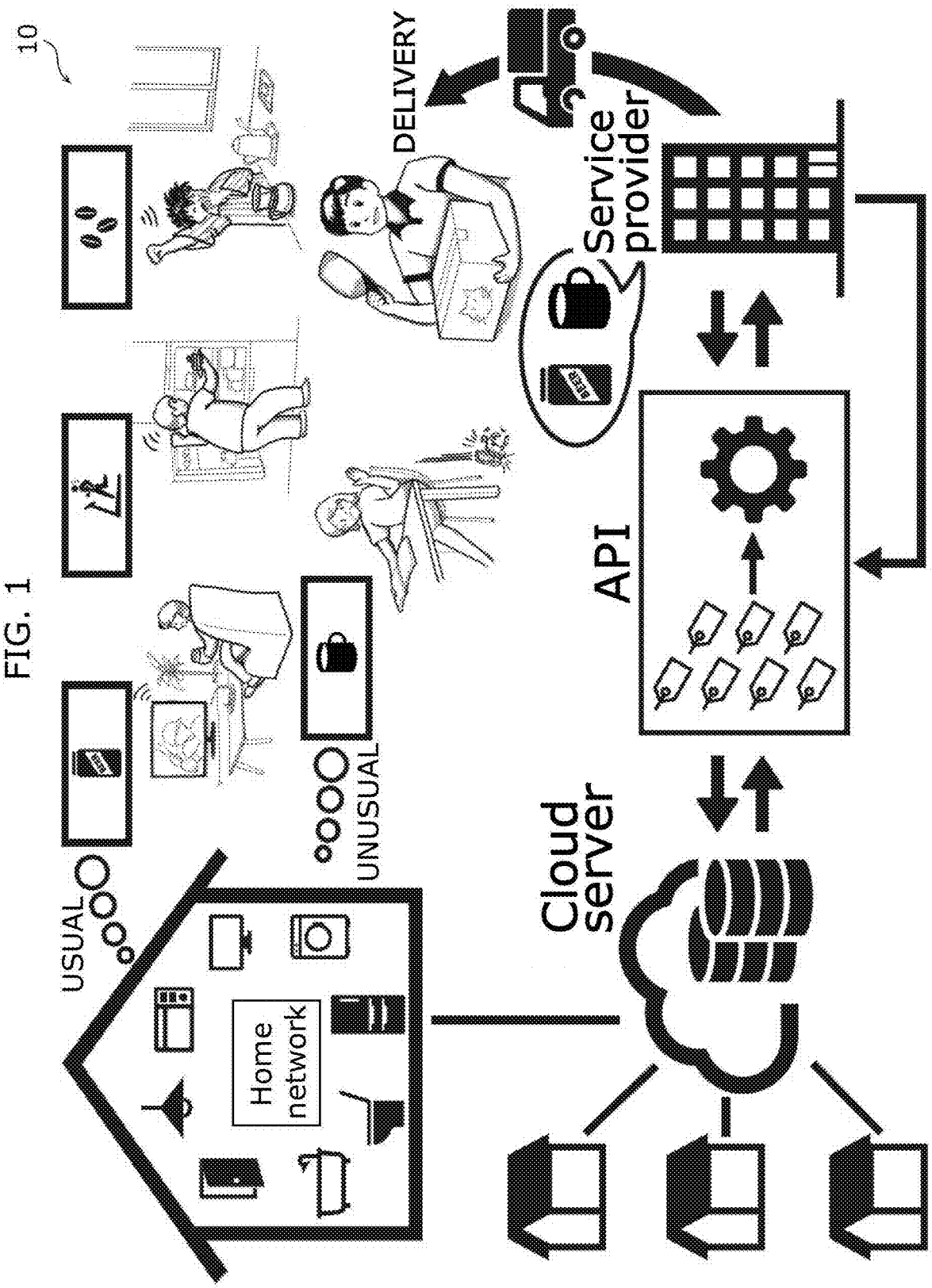
FIG. 1 illustrates an overview of the service providing system according to Embodiment 1.

First, an overview of service providing system 10 will be described with reference to FIG. 1. FIG. 1 illustrates an overview of service providing system 10 according to Embodiment 1.

In service providing system 10 according to the present embodiment, sensor data from a plurality of indoor spaces is collected by a cloud server. Examples of an indoor space include a home, an office, a building, and the inside of a vehicle. Sensor data is data based on usual activity and/or unusual activity of a user in an indoor space.

Via an application programming interface (API), each of a plurality of service providers is capable of obtaining various information based on sensor data collected by the cloud server. An API is an information processing function of a cloud server that can be called from a computer and used.

Each service provider provides a service to a user based on information obtained via the API. Examples of services include an information providing service, an advertisement delivery service, a service for automated control of devices on a home network, or any combination thereof. Note that the service is not limited to these examples. For example, the service may be a product delivery service.

Configuration of Service Providing System 10

Figure 2:
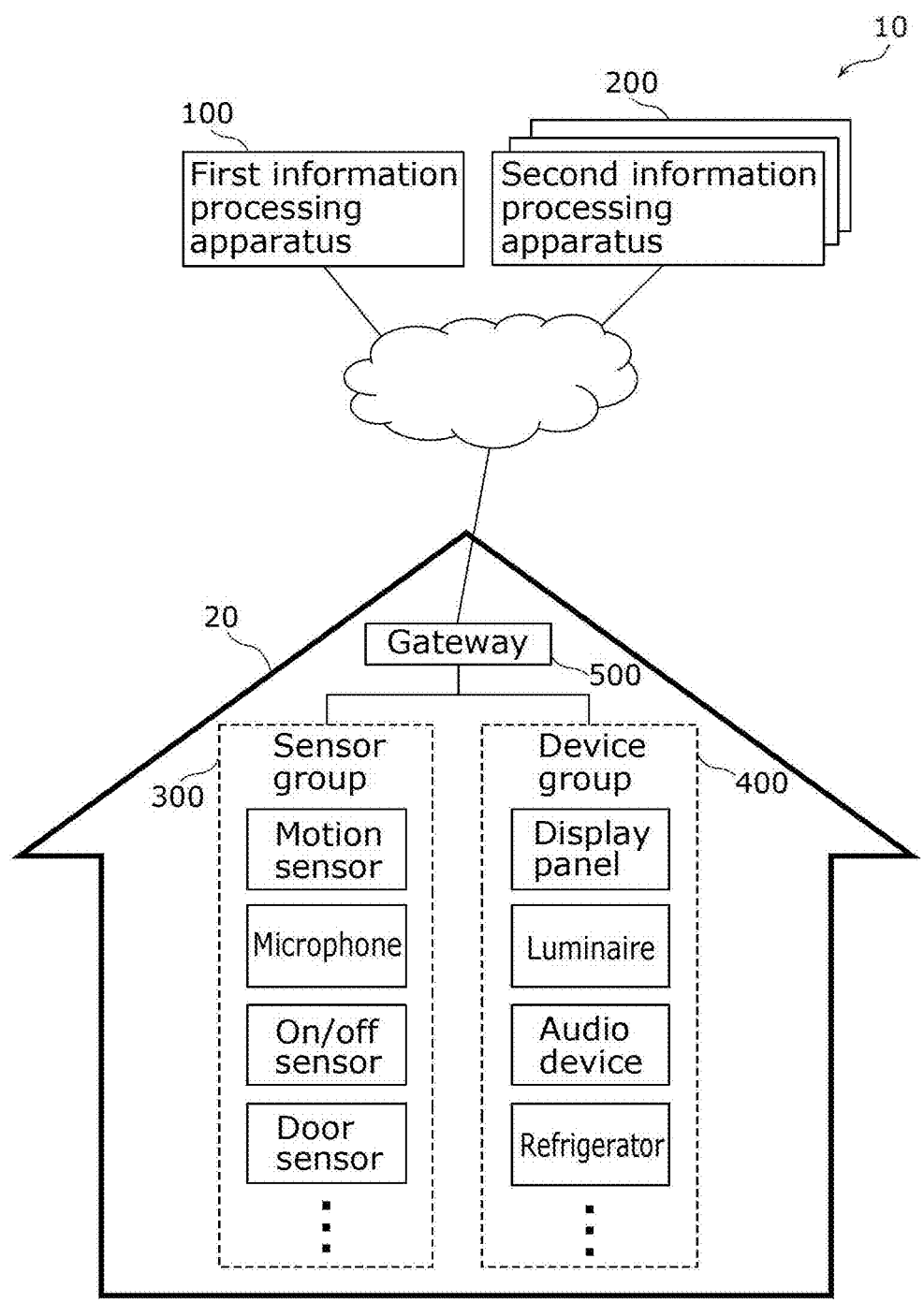
FIG. 2 illustrates the configuration of the service providing system according to Embodiment 1.

Next, the configuration of service providing system 10 will be described with reference to FIG. 2. FIG. 2 illustrates a configuration of service providing system 10 according to Embodiment 1. As illustrated in FIG. 2, service providing system 10 according to the present embodiment includes first information processing apparatus 100, second information processing apparatus 200, sensor group 300, and device group 400.

Sensor group 300 is disposed in space 20, and includes at least one sensor. Sensor group 300 is connected to a communications network such as the internet via gateway 500. Note that gateway 500 is optional; sensor group 300 may be connected to a communications network without passing through gateway 500.

Sensor group 300 outputs a sensor value indicating, for example, information related to an activity of a user or information related to user operation of device group 400. For example, sensor group 300 outputs a sensor value indicating whether a luminaire is emitting light, a sensor value indicating whether an audio device is outputting sound, a sensor value indicating whether a user is present in space 20 or a predefined region of space 20, or any combination thereof.

Sensor group 300 can include, for example, a motion sensor, a door sensor, a sound sensor, or any combination thereof. Such sensors included in sensor group 300 can be realized as, for example, an image sensor, an infrared sensor, an ultrasound sensor, a visible light sensor, a vibration sensor, a touch sensor, a microphone, or any combination thereof. Such sensors can be provided on a wall, floor, or ceiling that defines space 20, or on an electronic device or furniture disposed in space 20. Moreover, the sensors may be provided in devices included in device group 400. For example, one sensor may be a touch sensor provided in the touch screen of a smartphone or the like. Note that the sensors are not limited to the above examples.

Device group 400 is disposed in space 20, and includes at least one electronic device. Device group 400 is connected to a communications network such as the internet via gateway 500. Note that gateway 500 is optional; device group 400 may be connected to a communications network without passing through gateway 500.

Device group 400 can include, for example, a display panel, a luminaire, an audio device, a refrigerator, a vacuum cleaner, or any combination thereof. Note that the one or more devices included in device group 400 are not limited to these examples.

First information processing apparatus 100 is disposed outside of space 20 and includes a processor and memory. For example, first information processing apparatus 100 corresponds to the cloud server illustrated in FIG. 1. Note that first information processing apparatus 100 may be an edge server disposed in space 20.

Note that a cloud server refers to a server that is provided over the internet. An edge server refers to a server that is provided over a network in an area closer to the user than the internet is (such as a local area network (LAN)).

Second information processing apparatus 200 includes a processor and memory. For example, second information processing apparatus 200 is the service provider illustrated in FIG. 1. Second information processing apparatus 200 provides a service to a user via device group 400 in space 20.

This example assumes that service providing system 10 illustrated in FIG. 2 is provided in each of a plurality of indoor spaces. More specifically, first information processing apparatus 100 is provided for each of a plurality of indoor spaces, and a plurality of second information processing apparatuses 200 are connected to each first information processing apparatus 100 to provide services to each indoor space. Here, the aim is to provide of a variety of information regarding users or spaces 20 from the plurality of first information processing apparatuses 100, and to provide a variety of services using the plurality of second information processing apparatuses 200, by providing a plurality of first information processing apparatuses 100 and a plurality of second information processing apparatuses 200 individual of one another. However, new information is exchanged between the plurality of first information processing apparatuses 100 and the plurality of second information processing apparatuses 200. The present embodiment provides a system which effectively uses sensor data and provides appropriate services, by defining the exchange of such information.

Functional Configuration of First Information Processing Apparatus 100

Figure 3:
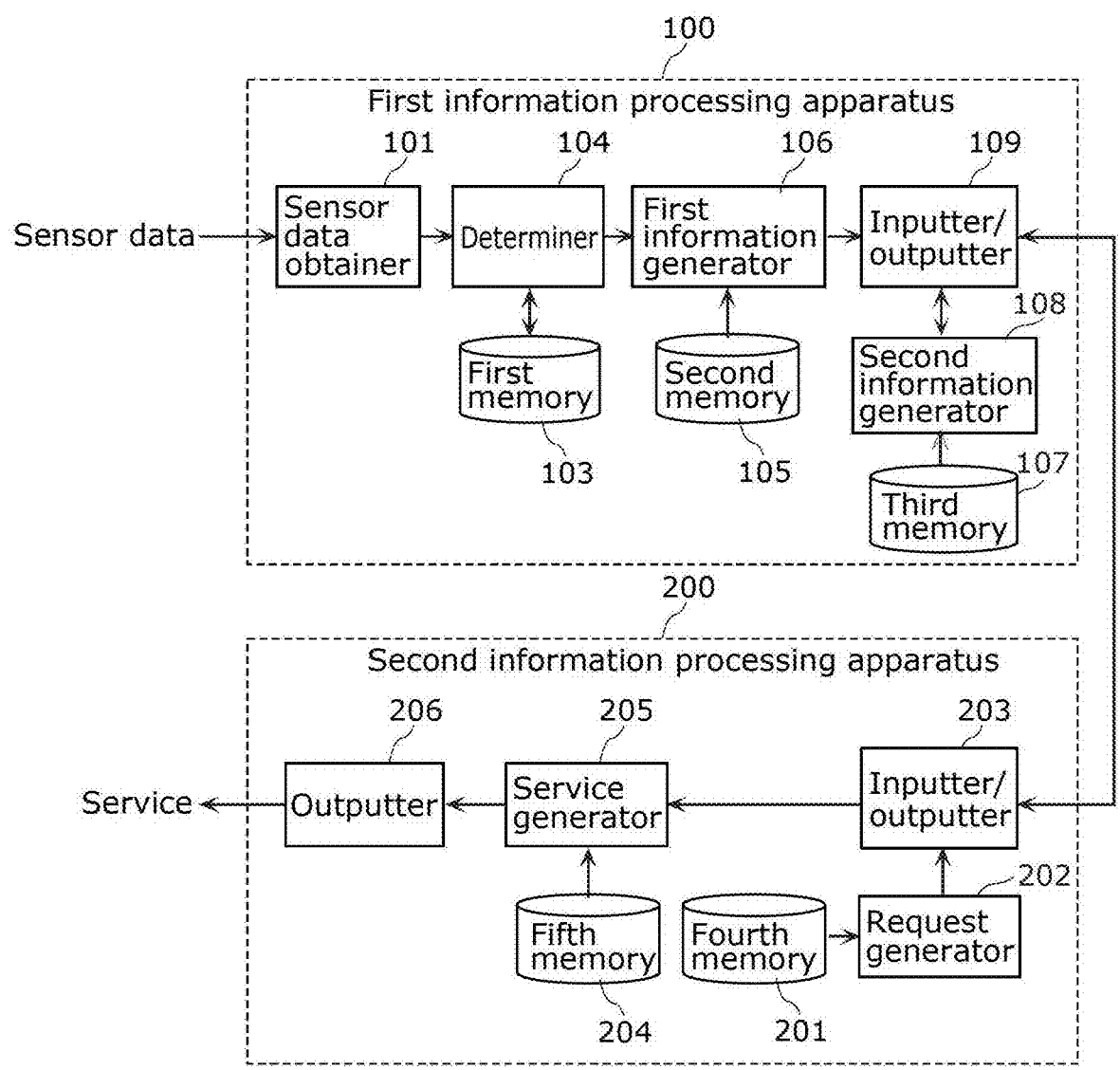
FIG. 3 illustrates the functional configurations of the first information processing apparatus and the second information processing apparatus according to Embodiment 1.

Next, the functional configuration of first information processing apparatus 100 will be described with reference to FIG. 3. FIG. 3 illustrates the functional configurations of first information processing apparatus 100 and second information processing apparatus 200 according to Embodiment 1.

As illustrated in FIG. 3, first information processing apparatus 100 according to the present embodiment includes sensor data obtainer 101, first memory 103, determiner 104, second memory 105, first information generator 106, third memory 107, second information generator 108, and inputter/outputter 109. Next, the functional blocks included in first information processing apparatus 100 will be described.

Sensor data obtainer 101 obtains first sensor data including a first sensor value from sensor group 300. Part or all of first sensor data is stored in first memory 103. First sensor data may include data indicating whether a person is present in a given region in space 20, for example. First sensor data may include data indicating a state of sound output of an audio device, for example. First sensor data may include data indicating an operation state of a device. First sensor data may include data indicating whether a door of a refrigerator is open or closed.

After the first information is generated by first information generator 106, sensor data obtainer 101 further obtains second sensor data including a second sensor value from sensor group 300, In present embodiment, the second sensor value is exemplified as, but not limited to, the sensor value of a motion sensor.

First memory 103 stores part or all of the first sensor data obtained by sensor data obtainer 101. Next, one example of the first sensor data stored in first memory 103 will be given with reference to FIG. 4.

Figure 4:
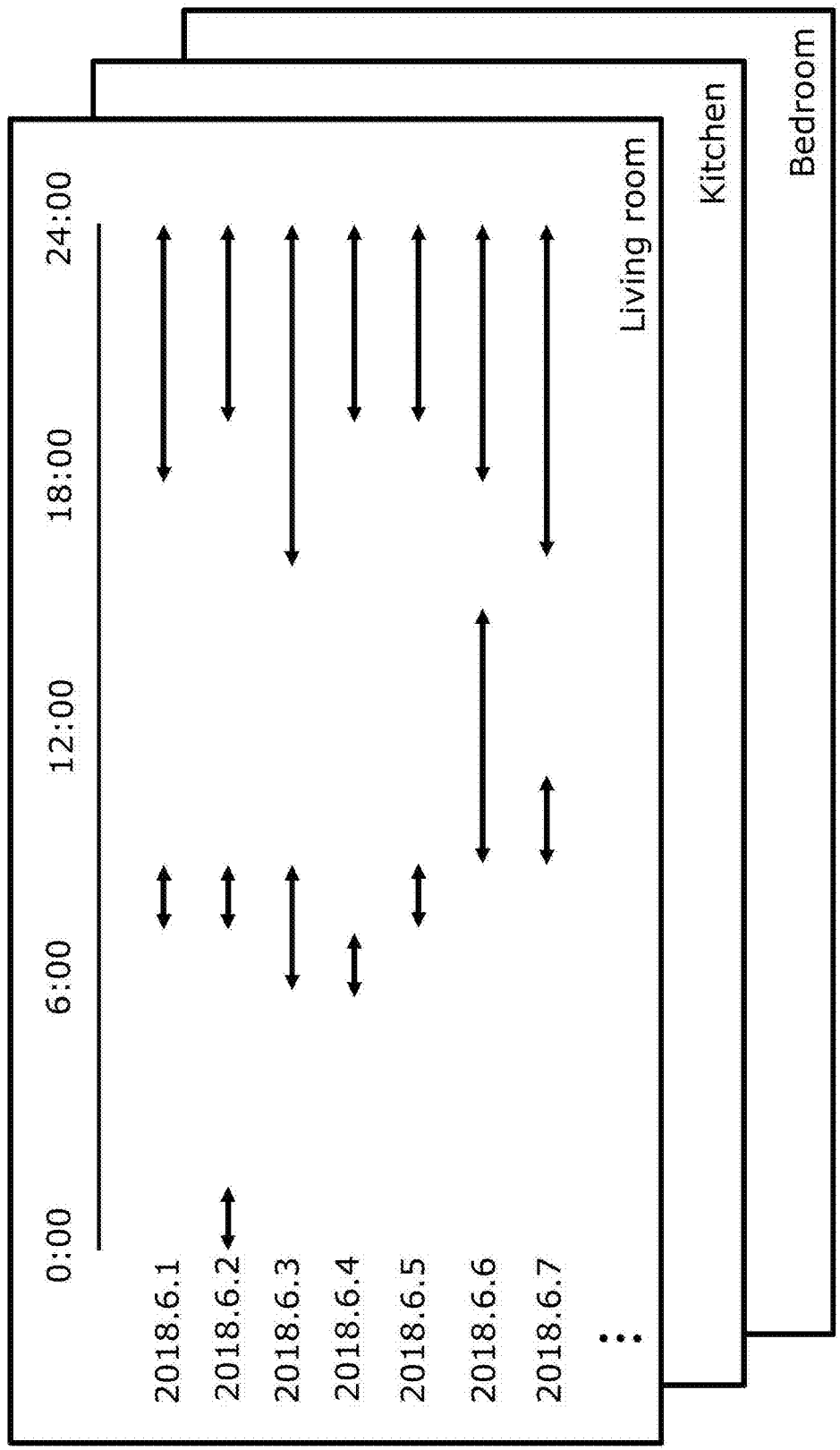
FIG. 4 illustrates one example of sensor data according to Embodiment 1.

FIG. 4 illustrates one example of the first sensor data stored in first memory 103 according to Embodiment 1. In FIG. 4, the first sensor data indicates the time, per day, that a luminaire is emitting light, for each of predefined regions of space 20 (a living room, a kitchen, and a bedroom).

For example, FIG. 4 shows that a luminaire is emitting light in the living room on Jun. 1, 2018, from 7:00 to 8:00 and from 18:00 to 24:00. Note that the first sensor data illustrated in FIG. 4 is merely one non-limiting example.

Determiner 104 obtains presence information indicating whether a user is present in space 20, based on the first sensor data. Determiner 104 further obtains past lighting information indicating past emission periods in which the luminaire emitted light. Determiner 104 further obtains current lighting information indicating whether the luminaire is currently emitting light. Determiner 104 further obtains operating status information indicating whether the audio device is outputting sound. Determiner 104 obtains an amount of movement of the user based on the second sensor data.

Determiner 104 may further obtain door information indicating whether a door of a refrigerator disposed in space 20 is open or closed. Determiner 104 may further obtain sound information collected by a sound collection apparatus (microphone) disposed in space 20.

Next, specific examples of the past lighting information will be given with reference to FIG. 5A and FIG. 5B. FIG. 5A and FIG. 5B each illustrate one example of the past lighting information according to Embodiment 1. FIG. 5A illustrates past lighting information for the living room, and FIG. 5B illustrates past lighting information for the kitchen. Here, the past lighting information is expressed in terms of emission rate per given period in the given region.

For example, FIG. 5A shows that the luminaire emitted light at a rate of 10% between 0:00 and 1:00 in the living room. Here, emission rate expresses the proportion of the total period in a given span of time that light was emitted. For example, when the emission time between 0:00 and 1:00 over 10 days is one hour, the emission rate calculates to 10% (=1 hour/10 hours×100). The given span of time can be a recent span of time of a length that is empirically or experimentally predefined. The method used to calculate the emission rate is not limited to this example.

Determiner 104 can obtain past emission periods in which the luminaire emitted light by referencing the past lighting information. For example, determiner 104 can determine each period whose emission rate is greater than or equal to a threshold rate (for example, 50%) to be an emission period and each period whose emission rate is less than the threshold rate to be a non-emission period.

Note that the past lighting information illustrated in FIG. 5A and FIG. 5B are non-limiting examples. For example, the length of the period is not limited to one hour, and may be 10 minutes, 15 minutes, 30 minutes, or 3 hours. Not all periods need to be the same length; a period during the day and a period during the night may be different lengths. The past lighting information need not be provided in units of regions of space 20 and may be provided in units of spaces 20.

Next, determiner 104 determines whether a first condition is satisfied or not, Determiner 104 further determines whether a second condition is satisfied or not.

In the present embodiment, the first condition is defined by (i) through (iv) given below.
  (i) The presence information indicates that the user is in space 20.
  (ii) The current lighting information indicates that a luminaire is currently emitting light.
  (iii) The current time is not included in an emission period indicated in the past lighting information.
  (iv) The operating status information indicates that an audio device is not outputting sound.

Note that the first condition is not limited to (i) through (iv) described above. For example, the first condition may include at least one of (v) through (vii) described below in addition to (i) through (iv) described above.
  (v) The door information indicates that a refrigerator door was opened or closed within a given period from the current time.
  (vi) The sound information includes the sound of a container containing a beverage being opened or the sound of the wrapper of a food product being opened within a given period from the current time.
  (vii) The current time is included in a given period of the night.

As used herein, the term "current" is not limited to the precise current time, but includes times that would usually be considered to be essentially the current time. For example, the current time as defined by a system (commonly referred to as the system time) may be used as the "current time".

An empirically or experimentally predefined period can be used as the given period described above in (v) and (vi). For example, a period of 10 minutes, 20 minutes, 30 minutes, or one hour can be used as the given period, but these examples are non-limiting. Moreover, a period predefined as a period of the night can be used as the given period of the night described above in (vii). For example, 18:00 to 6:00 can be used as the given period of the night, but this example is non-limiting.

User operation information may be used instead of lighting information. User operation information is information related to whether a given device disposed in space 20 was operated or not. Accordingly, current user-operation information indicates whether the device was operated within a given period from the current time. Past user-operation information indicates an operation period in which the device was operated in the past. When the user operation information is used instead of the lighting information, the first condition may include (viii) through (ix) described below instead of (i) through (iv) described above.
  (viii) The current user-operation information indicates that the device was operated within a given period from the current time.

(ix) The current time is not included in an operation period indicated in the past user-operation information.

User activity information may be used instead of the lighting information or the user operation information. User activity information is information related to the activity and inactivity of a user in space 20.

Note that any given combination of (i) through (ix) described above may be used as the first condition.

In the present embodiment, the second condition is defined by (x) given below.

(x) The amount of movement of a user is less than or equal to a given amount.

Note that second condition is not limited to (x) described above.

Second memory 105 stores information for generating the first information and information for generating third information. For example, second memory 105 stores a correspondence table in which content of the generated information is associated with mutually different conditions.

First information generator 106 generates first information when the first condition is satisfied. The first information indicates that the user is in space 20 at a time at which the user is not usually in space 20. In other words, the first information indicates that the user is, uncommon for that time, in space 20.

First information generator 106 further generates the third information when the second condition is satisfied. The third information indicates that the user is in space 20 at a time at which the user is not usually in space 20, and the user's amount of movement is decreasing. In other words, the third information indicates that the user is—uncommon for that time—in space 20, but their amount of activity is decreasing.

Third memory 107 stores information for generating second information and information for generating fourth information. In other words, third memory 107 stores information for identifying the user or space 20 corresponding to the first information and the third information generated by first information generator 106.

Second information generator 108 determines whether content of the first information is included in first request content included in information obtained from second information processing apparatus 200 via inputter/outputter 109. When content of the first information is included in the first request content, second information generator 108 generates the second information using the first information. The second information includes information for identifying the user or space 20 (for example, a user ID, a home address, an IP address, device identification information, etc.). For example, second information generator 108 generates the second information by reading, from third memory 107, information for identifying the user or space 20 corresponding to the first information generated by first information generator 106. Here, the second information may be information required for providing a service to the user or space 20. When content of the service to be provided is included in the first request, the second information corresponding to the content of the service may be provided. In a case in which the service is to be provided using a communications environment, one example of the second information is an IP address. In a case in which the service to be provided is for controlling a device, one example of the second information is device identification information. In a case in which the service to be provided is for controlling a device using a communications environment, one example of second information may be a combination of an IP address and device identification information.

Second information generator 108 further determines whether content of the third information is included in second request content included in information obtained from second information processing apparatus 200 via inputter/outputter 109. When content of the third information is included in the second request content, second information generator 108 generates the fourth information using the third information. The fourth information includes information for identifying a user or space 20. For example, second information generator 108 generates the fourth information by reading, from third memory 107, information for identifying the user or space 20 corresponding to the third information generated by first information generator 106.

Inputter/outputter 109 obtains information indicating the first request content (hereinafter "first request information") and information indicating the second request content (hereinafter "second request information") from second information processing apparatus 200 connected to first information processing apparatus 100 over a network. Inputter/outputter 109 further outputs the second information and the fourth information generated by second information generator 108 to second information processing apparatus 200.

Note that determiner 104, first information generator 106, and second information generator 108 described above are realized as, for example, a processor and memory. When an instruction or a software program that is stored in the memory is executed, the processor functions as determiner 104, first information generator 106, and second information generator 108. Determiner 104, first information generator 106, and second information generator 108 may be realized as dedicated electronic circuitry.

First memory 103, second memory 105, and third memory 107 described above are realized as, for example, semiconductor memory and/or a disk drive or the like. Inputter/outputter 109 is realized as, for example, a network interface controller (NIC) or the like.

Functional Configuration of Second Information Processing Apparatus 200

Next, the functional configuration of second information processing apparatus 200 will be described with reference to FIG. 3.

As illustrated in FIG. 3, second information processing apparatus 200 according to the present embodiment includes fourth memory 201, request generator 202, inputter/outputter 203, fifth memory 204, service generator 205, and outputter 206. Next, the functional blocks of second information processing apparatus 200 will be described.

Fourth memory 201 stores information for generating the first request information and the second request information.

Request generator 202 generates the first request information and the second request information. More specifically, request generator 202 references information stored in fourth memory 201 to generate the first request information indicating the first request content and the second request information indicating the second request content.

The first request content and the second request content indicate requirements that a user or space to which a given service is provided should meet. For example, the first request content indicates, as a requirement, that the user be in space 20 at a time at which the user is not usually in space 20. Moreover, for example, the second request content indicates that the user be in space 20 at a time at which the user is not usually in space 20 and that the user's amount of movement be decreasing. The first request content and the second request content are not limited to these examples.

Inputter/outputter 203 outputs the first request information and the second request information generated by request generator 202 to first information processing apparatus 100. Inputter/outputter 203 further obtains the second information and the fourth information from first information processing apparatus 100.

Fifth memory 204 stores information for generating service information. For example, fifth memory 204 stores a correspondence table in which service content is associated with mutually different request content.

Service generator 205 generates first service information using the second information. Service generator 205 also generates second service information using the fourth information. The service information is information for providing a service to a user in space 20 via device group 400.

The first service information is, for example, a control signal that causes an audio device disposed in space 20 that is identified by the second information to output a given piece of music. Here, a "given piece of music" is not particularly limited, and may be predetermined by, for example, the service provider or the user. The second service information is, for example, a control signal that lowers the volume of the given piece of music output by the audio device.

The first service information and the second service information are not limited to control signals for an audio device. For example, the first service information and the second service information may be control signals for a display panel. For example, when a person who is not the user is detected, the first service information and the second service information may be control signals that display, on the display panel disposed in space 20, advertisement information for security or theft insurance for space 20. If the user responded to a sound made by the detected person, information such as "didn't the sound yesterday frighten you?" may be displayed on the display panel. Note that "service information" may also be referred to as "service content". Service content includes service information such as music or advertisement information, and device control information for providing the service.

Outputter 206 references the second information and outputs the service information generated by service generator 205 to device group 400. As a result, for example, a given piece of music is output from an audio device included in device group 400. Note that second information processing apparatus 200 may include memory for recording the association between information corresponding to the second information and information required for providing the service, obtain information required for providing the service by referencing the second information, and provide the service to the user or space 20.

Request generator 202 and service generator 205 described above are realized as, for example, a processor and memory. When an instruction or a software program that is stored in the memory is executed, the processor functions as request generator 202 and service generator 205. Request generator 202 and service generator 205 may be realized as dedicated electronic circuitry.

Fourth memory 201 and fifth memory 204 described above are realized as, for example, semiconductor memory and/or a disk drive or the like. Inputter/outputter 203 and outputter 206 are realized as, for example, a network interface controller (NIC) or the like.

Interaction in Service Providing System 10

Next, interaction in service providing system 10 will be described with reference to FIG. 6 and FIG. 7. FIG. 6 and FIG. 7 are sequence diagrams for service providing system 10 according to Embodiment 1.

First, as illustrated in FIG. 6, first information processing apparatus 100 obtains the first sensor data including the first sensor value from sensor group 300 (S101). First information processing apparatus 100 determines whether the first condition is satisfied based on the first sensor data (S102). Stated differently, the obtainment of the first sensor data can be said to be trigger information for determining whether the first condition is satisfied. If the first condition is satisfied, first information processing apparatus 100 generates the first information (S103). The first sensor data that serves as the trigger information for determining whether the first condition is satisfied is used in the determining of whether the first condition is satisfied. In other words, in addition to being used as trigger information, the first sensor data can be used in the determining of whether the first condition is satisfied, which corresponds to a condition for providing a service. Moreover, first sensor data that served as trigger information for determining whether the first condition is satisfied in the past may be used in the determining whether the first condition is satisfied.

Here, if first information processing apparatus 100 obtains the first request information from second information processing apparatus 200 (S111), first information processing apparatus 100 determines whether there is a user or space that satisfies the first request content (S112). If first information processing apparatus 100 determines that there is a user or space that satisfies the first request content, first information processing apparatus 100 generates the second information (S113). First information processing apparatus 100 then outputs the generated second information to second information processing apparatus 200 (S114).

Second information processing apparatus 200 generates the first service information based on the second information (S121). The first service information is information for providing a first service to the user in space 20 via device group 400. Second information processing apparatus 200 then outputs the first service information to device group 400 (S122).

Next, as illustrated in FIG. 7, first information processing apparatus 100 obtains the second sensor data including the second sensor value from sensor group 300 (S201). First information processing apparatus 100 determines whether the second condition is satisfied based on the second sensor data (S202). If the second condition is satisfied, first information processing apparatus 100 generates the third information (S203).

Here, if first information processing apparatus 100 obtains the second request information from second information processing apparatus 200 (S211), first information processing apparatus 100 determines whether there is a user or space that satisfies the second request content (S212). If first information processing apparatus 100 determines that there is a user or space that satisfies the second request content, first information processing apparatus 100 generates the fourth information (S213). First information processing apparatus 100 then outputs the generated fourth information to second information processing apparatus 200 (S214).

Second information processing apparatus 200 generates the second service information based on the fourth information (S221). The second service information is information for providing a second service to the user in space 20 via device group 400. Second information processing apparatus 200 then outputs the second service information to device group 400 (S222).

Note that the sequence diagrams illustrated in FIG. 6 and FIG. 7 are non-limiting examples. For example, the processing illustrated in FIG. 7 need not be performed. Moreover, the order of the processes in FIG. 6 and FIG. 7 may be changed.

Processes Performed by First Information Processing Apparatus 100

Figure 8:
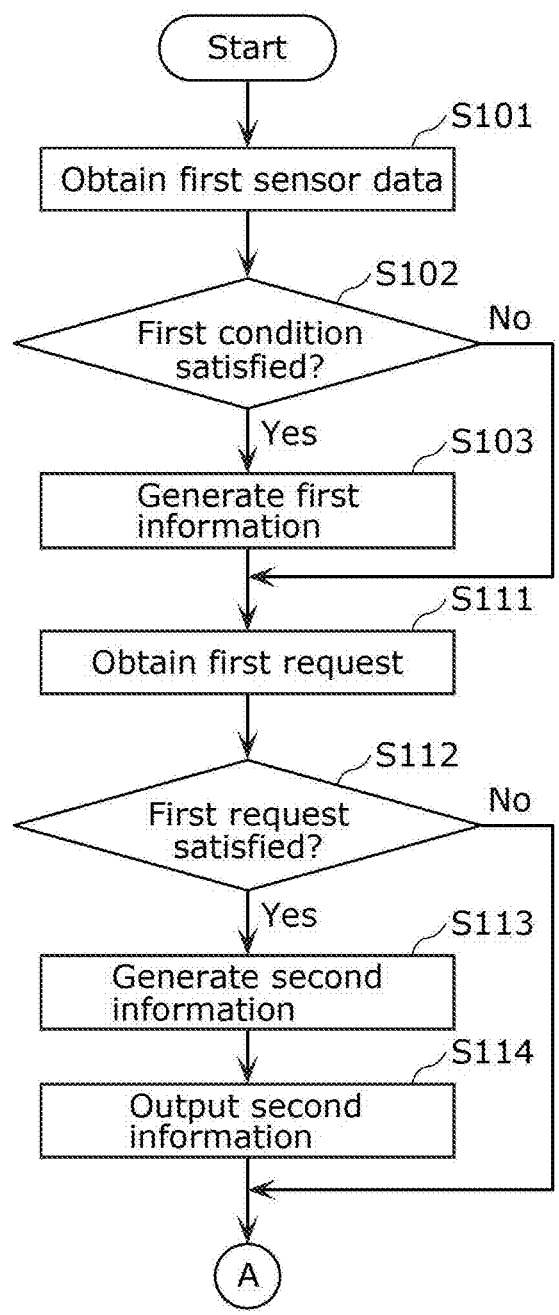
FIG. 8 is a flow chart illustrating processes performed by the first information processing apparatus according to Embodiment 1.

Next, processes performed by first information processing apparatus 100 (i.e., the information providing method) will be described in greater detail with reference to FIG. 8 and FIG. 9. FIG. 8 and FIG. 9 are flow charts illustrating processes performed by first information processing apparatus 100 according to Embodiment 1.

First, as illustrated in FIG. 8, sensor data obtainer 101 obtains the first sensor data including the first sensor value from sensor group 300 disposed in space 20 (S101). Determiner 104 determines whether the first condition is satisfied based on the first sensor data (S102). This determination process will be described in greater detail later with reference to the figures.

If the first condition is satisfied (Yes in S102), first information generator 106 generates the first information (S103). If the first condition is not satisfied (No in S102), first information generator 106 skips the process for generating the first information, that is to say, first information generator 106 does not generate the first information.

Next, inputter/outputter 109 obtains the first request information indicating the first request content from second information processing apparatus 200 (S111). Second information generator 108 determines whether there is a user or space that matches the first request content (S112). In other words, second information generator 108 determines whether the first request content includes the content of the first information or not.

When second information generator 108 determines that there is a user or space that matches the first request content (Yes in S112), second information generator 108 generates the second information using the first information (S113). Inputter/outputter 203 then outputs the generated second information to second information processing apparatus 200 (S114). When second information generator 108 determines that there is not a user or space that matches the first request content (No in S112), second information generator 108 skips the processes for generating and outputting the second information. In other words, second information generator 108 does not generate and output the second information.

Next, as illustrated in FIG. 9, sensor data obtainer 101 obtains the second sensor data including the second sensor value from sensor group 300 disposed in space 20 (S201). Determiner 104 determines whether the second condition is satisfied based on the second sensor data (S202). This determination process will be described in greater detail later with reference to the figures.

If the second condition is satisfied (Yes in S202), first information generator 106 generates the third information (S203). If the second condition is not satisfied (No in S202), first information generator 106 skips the process for generating the third information, that is to say, first information generator 106 does not generate the third information.

Next, inputter/outputter 109 obtains the second request information indicating the second request content from second information processing apparatus 200 (S211). Second information generator 108 determines whether there is a user or space that matches the second request content (S212). In other words, second information generator 108 determines whether the second request content includes the content of the third information or not.

When second information generator 108 determines that there is a user or space that matches the second request content (Yes in S212), second information generator 108 generates the fourth information using the third information (S213). Inputter/outputter 203 then outputs the generated fourth information to second information processing apparatus 200 (S214). When second information generator 208 determines that there is not a user or space that matches the second request content (No in S212), second information generator 108 skips the processes for generating and outputting the fourth information. In other words, second information generator 108 does not generate and output the fourth information.

First Condition Determination Process

Next, the determination process for the first condition illustrated in FIG. 8 (S102) will be described in greater detail with reference to FIG. 10. FIG. 10 is a flow chart illustrating one example of the determination process for the first condition according to Embodiment 1. More specifically, FIG. 10 illustrates the determination process for the first condition that includes (i) through (iv) described above.

First, determiner 104 determines whether a user is present in space 20 based on the first sensor data (S1021). In other words, determiner 104 determines whether (i) described above is satisfied or not.

When determiner 104 determines that a user is present in space 20 (Yes in S1021), determiner 104 determines whether a luminaire is currently emitting light based on the current lighting information (S1022). In other words, determiner 104 determines whether (ii) described above is satisfied or not.

When determiner 104 determines that a luminaire is currently emitting light (Yes in S1022), determiner 104 determines whether the current time is included in a past emission period based on past lighting information (S1023). In other words, determiner 104 determines whether (iii) described above is satisfied or not.

When determiner 104 determines that the current time is not included in a past emission period (No in S1023), determiner 104 determines whether an audio device is outputting sound based on operating status information corresponding to the audio device (S1024). In other words, determiner 104 determines whether (iv) described above is satisfied or not.

When determiner 104 determines that the audio device is not outputting sound (No in S1024), determiner 104 determines that the first condition is satisfied (S1025). However, when determiner 104 determines that a user is not present in space 20 (No in S1021), determines that a luminaire is not currently emitting light (No in S1022), determines that the current time is included in a past emission period (Yes in S1023), or determines that an audio device is outputting sound (Yes in S1024), determiner 104 determines that the first condition is not satisfied (S1026).

Note that the determination process for the first condition illustrated in FIG. 10 is merely one non-limiting example. If the first condition is different, the determination process is also different. Hereinafter, another example of a determination process for the first condition will be given with reference to FIG. 11A through FIG. 11D.

Another Example of First Condition Determination Process

FIG. 11A is a flow chart illustrating another example of the determination process for the first condition according to Embodiment 1. More specifically, FIG. 11A illustrates the determination process for the first condition that includes (v) described above in addition to (i) through (iv) described above.

In FIG. 11A, when determiner 104 determines that an audio device is not outputting sound (No in S1024), determiner 104 determines whether a refrigerator door was opened or closed within a given period from the current time based on the door information indicating whether a door of a refrigerator is open or closed (S1027A). In other words, determiner 104 determines whether (v) described above is satisfied or not. When determiner 104 determines that a refrigerator door was opened or closed (Yes in S1027A), determiner 104 determines that the first condition is satisfied (S1025). However, when determiner 104 determines that a refrigerator door was not opened or closed (No in S1027A), determiner 104 determines that the first condition is not satisfied (S1026).

Figure 11B:
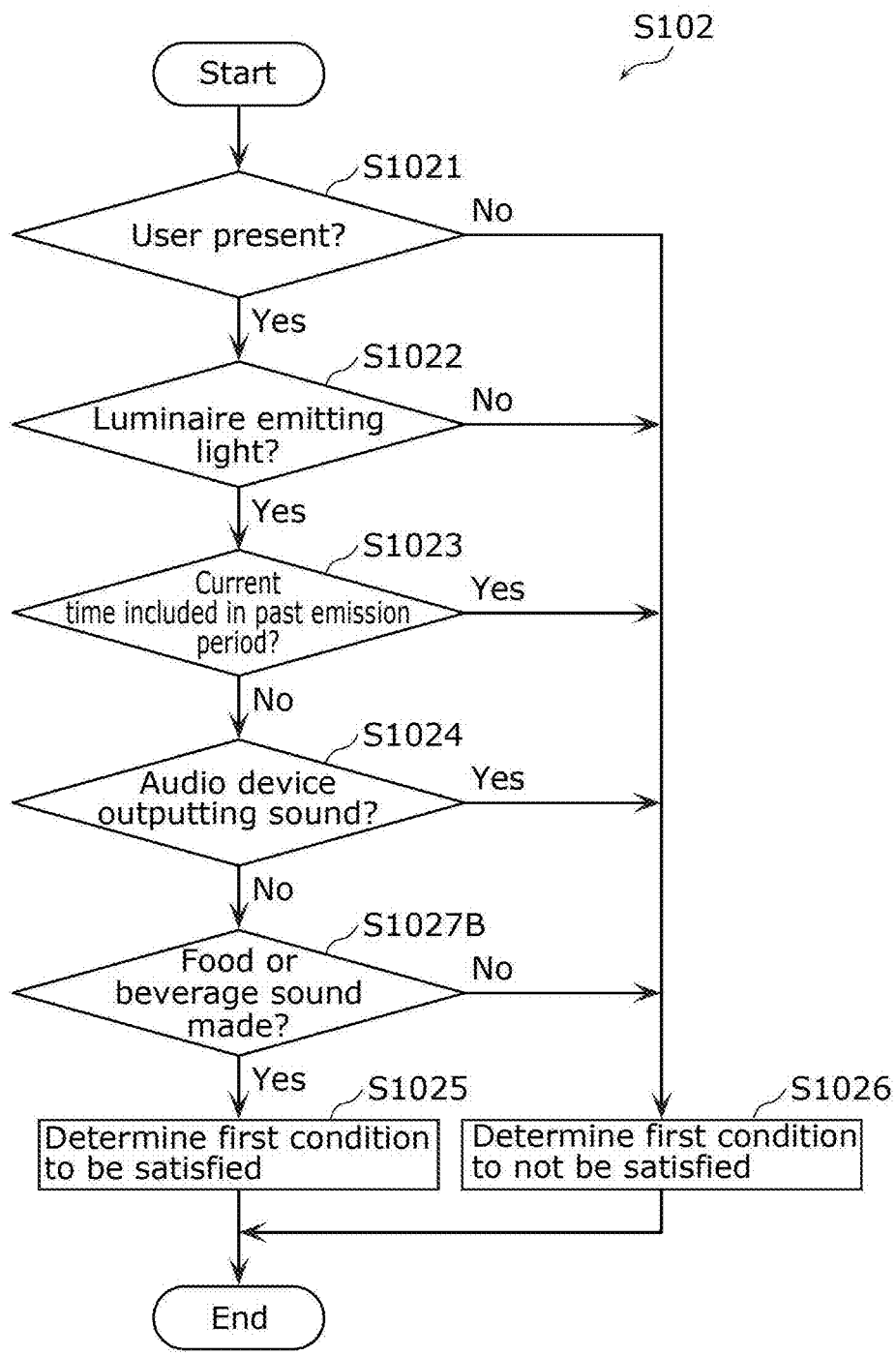
FIG. 11B is a flow chart illustrating another example of the determination process for the first condition according to Embodiment 1.

FIG. 11B is a flow chart illustrating another example of the determination process for the first condition according to Embodiment 1. More specifically, FIG. 11B illustrates the determination process for the first condition that includes (vi) described above in addition to (i) through (iv) described above.

In FIG. 11B, when determiner 104 determines that an audio device is not outputting sound (No in S1024), determiner 104 determines whether the sound of a container containing a beverage being opened or the sound of the wrapper of a food product being opened was made within a given period from the current time based on the sound information (S1027B). In other words, determiner 104 determines whether (vi) described above is satisfied or not. When determiner 104 determines that the sound of a container containing a beverage being opened or the sound of the wrapper of a food product being opened was made within a given period from the current time (Yes in S1027B), determiner 104 determines that the first condition is satisfied (S1025). However, when determiner 104 determines that the sound of a container containing a beverage being opened or the sound of the wrapper of a food product being opened was not made within a given period from the current time (No in S1027B), determiner 104 determines that the first condition is not satisfied (S1026).

FIG. 11C is a flow chart illustrating another example of the determination process for the first condition according to Embodiment 1. More specifically, FIG. 11C illustrates the determination process for the first condition that includes (vii) described above in addition to (i) through (iv) described above.

In FIG. 11C, when determiner 104 determines that an audio device is not outputting sound (No in S1024), determiner 104 determines whether the current time is included in a given period of the night (S1027C). In other words, determiner 104 determines whether (vii) described above is satisfied or not. When determiner 104 determines that the current time is included in a given period of the night (Yes in S1027C), determiner 104 determines that the first condition is satisfied (S1025). However, when determiner 104 determines that the current time is not included in a given period of the night, within a given period from the current time (No in S1027C), determiner 104 determines that the first condition is not satisfied (S1026).

Figure 11D:
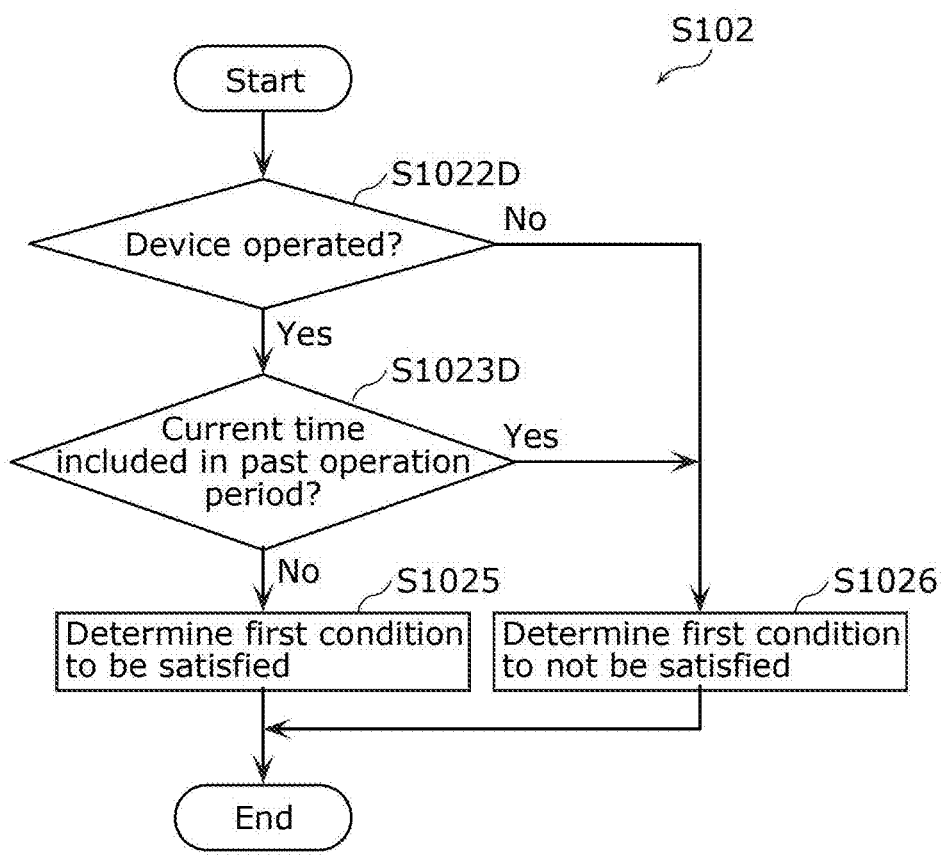
FIG. 11D is a flowchart illustrating another example of the determination process for the first condition according to Embodiment 1.

FIG. 11D is a flow chart illustrating another example of the determination process for the first condition according to Embodiment 1. More specifically, FIG. 11D illustrates the determination process for the first condition that includes (viii) through (ix) described above.

First, determiner 104 determines whether the device was operated within a given period from the current time based on the current user-operation information (S1022D). In other words, determiner 104 determines whether (viii) described above is satisfied or not.

When determiner 104 determines that the device was operated within a given period from the current time (Yes in S1022D), determiner 104 determines whether the current time is included in a past operation period based on the past user-operation information (S1023D). In other words, determiner 104 determines whether (ix) described above is satisfied or not.

When determiner 103 determines that the current time is not included in a past operation period (No in S1023D), determiner 104 determines that the first condition is satisfied (S1025). However, when determiner 103 determines that the device was not operated within a given period from the current time (No in S1022D) or determines that the current time is included in a past operation period (Yes in S1023D), determiner 104 determines that the first condition is not satisfied (S1026).

Note that the order of the steps illustrated in FIG. 10 and FIG. 11A through FIG. 11D is not limited to the illustrated order. For example, steps S1021 through S1024 may be performed in the reverse order, and, alternatively, may be performed in parallel.

Second Condition Determination Process

Figure 12:
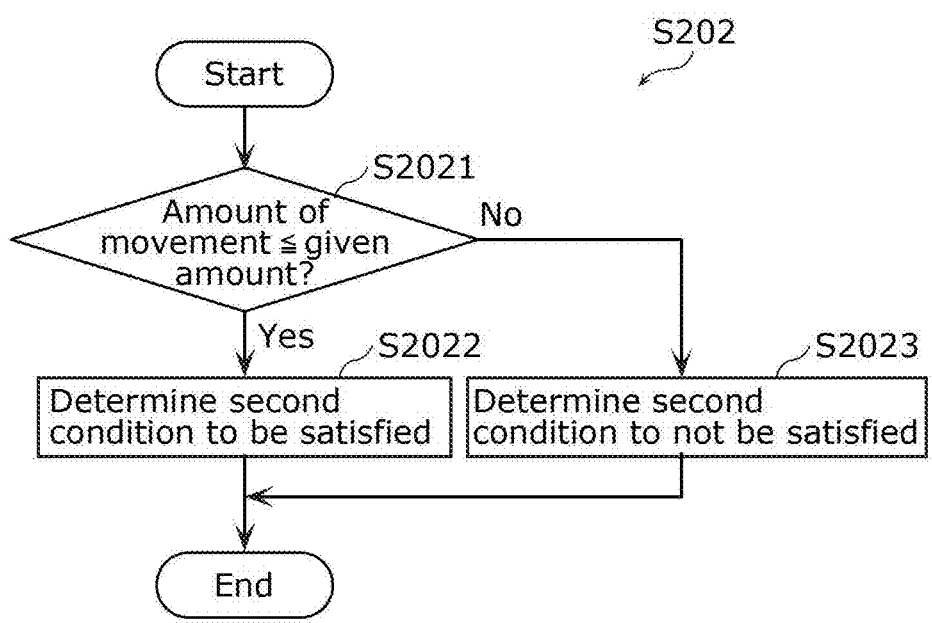
FIG. 12 is a flow chart illustrating one example of the determination process for the second condition according to Embodiment 1.

Next, the determination process for the second condition illustrated in FIG. 9 (S202) will be described in greater detail with reference to FIG. 12. FIG. 12 is a flow chart illustrating one example of the determination process for the second condition according to Embodiment 1. More specifically, FIG. 12 illustrates the determination process for the second condition that includes (x) described above.

Determiner 104 determines whether the amount of movement of a user obtained from the second sensor data is less than or equal to a given amount (S2021). In other words, determiner 104 determines whether (x) described above is satisfied or not.

When determiner 104 determines that the amount of movement is less than or equal to the given amount (Yes in S2021), determiner 104 determines that the second condition is satisfied (S2022). However, when determiner 104 determines that the amount of movement is not less than or equal to the given amount (No in S2021), determiner 104 determines that the second condition is not satisfied (S2023).

Advantageous Effects, etc.

As described above, the information providing method according to the present embodiment is a method that uses first information processing apparatus 100 which includes a processor and memory. A luminaire, an audio device that outputs sound, and a sensor are disposed in space 20. The processor, in operation, can: obtain presence information indicating whether a user is present in space 20, based on a first sensor value of the sensor; obtain past lighting information indicating a period in the past in which the luminaire emitted light; obtain current lighting information indicating whether the luminaire is currently emitting light; obtain operating status information indicating whether the audio device is outputting sound; when (i) the presence information indicates that the user is present in space 20, (ii) the current lighting information indicates that the luminaire is currently emitting light, (iii) a current time is not included in a period indicated in the past lighting information, and (iv) the operating status information indicates that the audio device is not outputting sound, generate first information indicating that the user is in space 20 at a time at which the user is not usually in space 20; obtain, from second information processing apparatus 200 connected to first information processing apparatus 100, information indicating first request content over a network; and when content of the first information is included in the first request content, output, to second information processing apparatus 200, second information including information for identifying the user or space 20, using the first information.

This makes it possible to determine the situation in space 20 using sensor data, namely that the user is in space 20 at a time at which the user is not usually in space 20. Accordingly, it is possible to output information for identifying a user or space 20 that is in such a situation to, for example, the service provider. As a result, it is possible for a service provider or the like to provide services appropriate for the situation of the user or space 20. It is therefore possible to effectively use sensor data to provide services.

In the information providing method according to the present embodiment, a refrigerator may further be disposed in space 20, and the processor may: obtain door information indicating whether a door of the refrigerator is open or closed; and when, in addition to (i) through (iv), (v) the door information indicates that the door of the refrigerator was opened or closed within a given period from the current time, generate the first information.

This makes it possible to more definitely determine the situation in space 20 using sensor data, namely that the user is in space 20 at a time at which the user is not usually in space 20, and provide services appropriate for the situation of the user or space 20.

In the information providing method according to the present embodiment, a sound collection apparatus that collects sound may further be disposed in space 20, and the processor may further: obtain sound information collected by the sound collection apparatus; and when, in addition to (i) through (iv), (vi) the sound information includes, within a given period from the current time, a sound of a container containing a beverage being opened or a sound of a wrapper of a food product being opened, generate the first information.

This makes it possible to more definitely determine the situation in space 20 using sensor data, namely that the user is in space 20 at a time at which the user is not usually in space 20, and provide services appropriate for the situation of the user or space 20.

In the information providing method according to the present embodiment, the processor may: when, in addition to (i) through (iv), (vii) the current time is included in a given period at night, generate the first information.

This makes it possible to determine the situation in space 20 using sensor data, namely that the user is in space 20 at a time in the night at which the user is not usually in space 20, and provide services appropriate for the situation of the user or space 20.

In the information providing method according to the present embodiment, the sensor may be a motion sensor, and the processor may: obtain a second sensor value from the motion sensor after generating the first information; when, based on the second sensor value, an amount of movement of the user is less than or equal to a given amount, generate third information indicating that the user is in space 20 at a time at which the user is not usually in space 20 and that the amount of movement is decreasing; obtain, from second information processing apparatus 200, information indicating second request content over the network; and when content of the third information is included in the second request content, output, to second information processing apparatus 200, fourth information including information for identifying the user or space 20, using the third information.

This makes it possible to determine the situation in space 20 using sensor data, namely that the user is in space 20 at a time at which the user is not usually in space 20 and that the user's amount of movement is decreasing. Accordingly, the service provider or the like can provide a second service in accordance with a change in the situation after providing the first service, which makes it possible to provide services that are further appropriate for the situation of the user or space 20.

The information providing method according to the present embodiment is a method that uses first information processing apparatus 100 which includes a processor and memory. A device is disposed in space 20, and the processor can: obtain past user-operation information indicating an operation period in which the device was operated in the past; obtain current user-operation information indicating whether the device was operated within a given period from a current time; when (viii) the current user-operation information indicates that the device was operated within the given period from the current time and (ix) the current time is not included in an operation period indicated in the past user-operation information, generate first information indicating that a user is in space 20 at a time at which the user is not usually in space 20; obtain, from second information processing apparatus 200 connected to first information processing apparatus 100, information indicating first request content over a network; and when content of the first information is included in the first request content, output, to second information processing apparatus 200, second information including information for identifying the user or space 20, using the first information.

This makes it possible to determine the situation in space 20 using sensor data different from the sensor data described above, namely that the user is in space 20 at a time at which the user is not usually in space 20. Accordingly, it is possible to output information for identifying the user or space 20 that is in such a situation to, for example, the service provider. As a result, it is possible for a service provider or the like to provide services appropriate for the situation of the user or space 20. It is therefore possible to effectively use sensor data to provide services.

The control method according to the present embodiment is a control method of an audio device that uses an information processing apparatus including a processor and memory. A luminaire, an audio device that outputs sound, and a sensor are disposed in space 20. The processor can: obtain presence information indicating whether a user is present in space 20, based on a first sensor value of the sensor; obtain past lighting information indicating a period in the past in which the luminaire emitted light; obtain current lighting information indicating whether the luminaire is currently emitting light; obtain operating status information indicating whether the audio device is outputting sound; and when (i) the presence information indicates that the user is present in space 20, (ii) the current lighting information indicates that the luminaire is currently emitting light, (iii) a current time is not included in a period indicated in the past lighting information, and (iv) the operating status information indicates that the audio device is not outputting sound, cause the audio device to output a given piece of music.

This makes it possible to cause an audio device to output a given piece of music by using the sensor data, when the user is in space 20 at a time at which the user is not usually in space 20. This makes it possible to, when, for example, the user is uncommonly awake late at night, relax the user with music and provide services suitable for the situation of the user or space 20.

In the control method of the audio device according to the present embodiment, the sensor may be a motion sensor, and the processor may: obtain a second sensor value from the motion sensor after causing the audio device to output the given piece of music; and when, based on the second sensor value, an amount of movement of the user is less than or equal to a given amount, lower a volume of the given piece of music output by the audio device.

This makes it possible to lower the volume of the music when the user's amount of movement decreases. Accordingly, when, for example, the user begins to doze, it is possible to inhibit the music from bothering the user's slumber, and provide services that are further suitable for the situation of the user or space 20.

The information processing apparatus according to the present embodiment is first information processing apparatus 100 which includes a processor and memory. The processor, in operation, can: obtain presence information indicating whether a user is present in space 20, based on a first sensor value of a sensor disposed in space 20; obtain past lighting information indicating a period in the past in which a luminaire disposed in space 20 emitted light; obtain current lighting information indicating whether the luminaire is currently emitting light; obtain operating status information indicating whether an audio device disposed in space 20 is outputting sound; when (i) the presence information indicates that the user is present in space 20, (ii) the current lighting information indicates that the luminaire is currently emitting light, (iii) a current time is not included in a period indicated in the past lighting information, and (iv) the operating status information indicates that the audio device is not outputting sound, generate first information indicating that the user is in space 20 at a time at which the user is not usually in space 20; obtain, from another information processing apparatus connected to the information processing apparatus, information indicating first request content over a network; and when content of the first information is included in the first request content, output, to second information processing apparatus 200, second information including information for identifying the user or space 20, using the first information.

This makes it possible to achieve the same advantageous effects as the information providing method described above.

Embodiment 2

Next, Embodiment 2 will be described. The present embodiment differs from Embodiment 1 described above mainly in that sound outside the home is used in the first condition and the first information indicates that the user feels uneasy about the sound outside the home. The present embodiment will be described with focus on the differences from Embodiment 1.

Configuration of Service Providing System 10A

Next, the configuration of service providing system 10A will be described with reference to FIG. 13. FIG. 13 illustrates a configuration of service providing system 10A according to Embodiment 2. As illustrated in FIG. 13, service providing system 10A according to the present embodiment includes first information processing apparatus 100, second information processing apparatus 200, sensor group 300A, and device group 400.

Sensor group 300A is disposed inside and/or outside of space 20, and includes at least one sensor. Sensor group 300A is connected to a communications network such as the internet via gateway 500. Note that gateway 500 is optional; sensor group 300A may be connected to a communications network without passing through gateway 500.

Sensor group 300A outputs sensor values indicating, for example, user biometric information, information indicating sound outside space 20, and device activity information for device group 400. Sensor group 300A can include, for example, a biometric sensor, an image sensor, an infrared sensor, an ultrasound sensor, a visible light sensor, a vibration sensor, a touch sensor, a microphone, or any combination thereof. Such sensors included in sensor group 300A can be provided on a wall, floor, or ceiling that defines space 20, or on an electronic device or furniture disposed inside or outside space 20. Moreover, the sensors may be provided in devices included in device group 400. For example, one sensor may be a touch sensor provided in the touch screen of a smartphone or the like. Note that the sensors are not limited to the above examples.

The interaction in service providing system 10A described above and the processes performed by first information processing apparatus 100 are as illustrated in FIG. 6 through FIG. 9. Accordingly, repeated illustration and description will be simplified or omitted. Note that in the present embodiment the processes illustrated in FIG. 7 and FIG. 9 may be omitted.

First Condition Determination Process

Next, the determination process for the first condition (S102 in FIG. 8) according to the present embodiment will be described in greater detail with reference to FIG. 14. FIG. 14 is a flow chart illustrating one example of the determination process for the first condition (S102) according to Embodiment 2.

In the present embodiment, the first condition includes at least (x) described below.

(x) Sound information from outside space 20 indicates sound different from usual sound.

Note that the first condition is not limited to (x) described above. For example, the first condition may include at least one of (xi) through (xiii) described below in addition to (x) described above.

(xi) A device that outputs sound is in an inactive state.

(xii) The biometric information indicates that the user feels uneasy.

(xiii) Weather information indicates rain.

When (x) through (xiii) described above are satisfied, it is estimated that the user feels uneasy, because music or the like is not being played inside the home and a noticeable, suspicious sound was made outside the home on a rainy day, which has a low probability of burglary. The user may be feeling that hastily going outside, in the dark, would be dangerous, and may be holding still inside his or her home.

FIG. 18 is a flow chart illustrating one example of the process for generating the second information (S113) according to Variation 3 of Embodiments 1 and 2. More specifically, FIG. 18 illustrates the determination process for the first condition that includes (x) through (xiii) described above.

First, determiner 104 determines whether the current sound outside space 20 is different from the usual sound based on the first sensor data (S1021E). In other words, determiner 104 determines whether (x) described above is satisfied or not.

More specifically, for example, determiner 104 determines whether the loudness of sound collected in a given span of time by a microphone disposed outside space 20 is greater than a threshold predefined as a threshold for the loudness of usual sound. Determiner 104 may, for example, determine whether sound collected in a given span of time by the microphone has a different frequency component than a frequency predefined as a frequency of usual sound.

Determiner 104 may, for example, determine whether sound collected in a given span of time by the microphone has a different frequency pattern than a frequency pattern predefined as a frequency pattern of usual sound.

When determiner 104 determines that the current sound outside space 20 is different from usual sound (Yes in S1021E), determiner 104 determines whether a device that outputs sound in space 20 is in an inactive state (S1022E). In other words, determiner 104 determines whether (xi) described above is satisfied or not.

Figures 15A, 15B:
FIG. 15A illustrates one example of a table according to Embodiment 2 in which activity states of devices that output sound are managed.
FIG. 15B illustrates one example of the weather information according to Embodiment 2.

For example, to make the determination, determiner 104 references device activity information indicating the activity status of devices that output sound. FIG. 15A illustrates one example of device activity information indicating activity states of devices that output sound according to Embodiment 2. The table illustrated in FIG. 15A shows that the television is in an active state and all other devices that output sound are in an inactive state. An inactive state refers to a state in which the sound output function of a device that outputs sound is not active.

Although devices that output sound are exemplified in FIG. 15A as a television, a speaker, a personal computer, a washing machine, and a vacuum cleaner, devices that output sound are not limited to these examples. Moreover, a device that outputs sound need not necessarily be disposed in space 20. For example, when a door of space 20 is open, a device that outputs sound may be disposed in a space adjacent to space 20.

When determiner 104 determines that devices that output sound are in an inactive state (Yes in S1022E), determiner 104 determines whether the biometric information indicates that the user feels uneasy (S1023E). In other words, determiner 104 determines whether (xii) described above is satisfied or not.

More specifically, determiner 104, for example, makes the determination by comparing current user biometric information obtained from a biometric sensor and uneasy biometric information predefined as biometric information indicating that the user is feeling uneasy. For example, heart rate, pulse rate, respiratory rate, blood pressure, or any combination thereof can be used as biometric information. The biometric sensor may be a wearable terminal, and, alternatively, need not be worn by the user.

Note that a known method can be used to obtain the heart rate. For example, electrocardiography, image analysis, or photoplethysmography can be used. A known method can also be used to obtain the pulse rate. For example, electrocardiography, image analysis, or photoplethysmography can be used. A known method can also be used to obtain the respiratory rate. For example, electrocardiography can be used. A known method can also be used to obtain the blood pressure. For example, a cuff-based method or a contactless measurement method that uses pulse wave propagation time can be used. Note that the methods for obtaining biometric information that are described above are non-limiting examples.

When determiner 104 determines that the biometric information indicates that the user feels uneasy (Yes in S1023E), determiner 104 determines whether the weather information for the current day indicates rain (S1024E). In other words, determiner 104 determines whether (xiii) described above is satisfied or not. More specifically, determiner 104 determines whether the weather for the current day indicates rain based on, for example, periodic weather information obtained from an external server.

The weather forecast with the longest length of time during the current data can be used as the weather forecast for the current day. For example, when 9 of the 24 hours of the day indicate rain and the remaining 15 hours indicate clear skies, "clear skies" may be used as the weather forecast for the current day.

Moreover, the weather forecast with the longest length of time among given time intervals may be used as the weather forecast for the current day. The given time interval may be a time interval set in advance by the user, and may be a time interval in which the user has left space 20.

Moreover, the weather forecast having a high, predefined priority level which corresponds to a threshold length of time or longer in the current day may be used as the weather forecast for the current day. For example, when the high priority level weather forecast is defined as rain and the threshold length of time is defined as three hours, if weather forecasts of rain total three or more hours in the current day, rain may be used as the weather forecast for the current day. The threshold length of time and the high priority level weather forecast may be predefined empirically or experimentally, and, alternatively, may be set by the user.

The weather information including the current day weather information set in such a manner is stored in first memory 103. FIG. 15B illustrates one example of the weather information according to Embodiment 2. The weather information illustrated in FIG. 15B includes weather information for one week, including weather information for the current day.

When determiner 104 determines that the weather information for the current day indicates rain (Yes in S1024E), determiner 104 determines that the first condition is satisfied (S1025). Consequently, processing from step S103 in FIG. 8 is performed. In this case, the generated first information indicates that the user feels uneasy about a sound made outside space 20.

However, when determiner 104 determines that a user is not present in space 20 (No in S1021E), determines that a luminaire is not currently emitting light (No in S1022E), determines that the current time is included in a past emission period (Yes in S1023E), or determines that an audio device is outputting sound (No in S1024E), determiner 104 determines that the first condition is not satisfied (S1026). Consequently, processing from step S111 in FIG. 8 is performed.

Note that the determination process for the first condition illustrated in FIG. 14 is merely one non-limiting example. If the first condition is different, the determination process is also different. For example, when the first condition does not include (xi) through (xiii) described above, steps S1022E through S1024E can be skipped.

Service Information

For example, the first information is generated (S103), whether the first request is satisfied is determined (S112), and the second information is generated (S113), based on the result of determining whether the first condition is satisfied or not as described above, just like in Embodiment 1. Then, based on the second information, second information processing apparatus 200 generates and outputs the first service information for providing the first service to the user in space 20 via device group 400 (S121 and S122).

In the present embodiment, second information processing apparatus 200 can output, as the first service information, a control signal that causes a display panel to display a screen recommending the user to purchase security goods (for example, an outdoor light), for example. The first service information may be a control signal that causes an audio device to play a given piece of music. For example, a piece of healing music that calms the user can be used as the given piece of music, but this example is non-limiting. The first service information may be a control signal that causes a display panel to display a screen recommending the user to watch a given television program. A variety show that lifts the user's spirits can be used as the given television program, but this example is non-limiting.

Moreover, in the present embodiment, when security goods have been purchased based on the first service information, the second service information may be a control signal that causes a display panel to display a screen that shows how to use the security goods.

Advantageous Effects, etc.

As described above, the information providing method according to the present embodiment is a method that uses first information processing apparatus 100 which includes a processor and memory. A microphone is disposed outside a home. The processor can: obtain information indicating current sound outside the home obtained by the microphone; (x) when the information indicating current sound outside the home indicates sound that is different from usual sound outside the home, generate first information indicating that a user feels uneasy about the sound outside the home; obtain, from second information processing apparatus 200 connected to first information processing apparatus 100, information indicating first request content over a network; and when content of the first information is included in the first request content, output, to second information processing apparatus 200, second information including information for identifying the user or the home, using the first information.

This makes it possible to estimate that the user feels uneasy based on sound information obtained by a microphone. Accordingly, it is possible to output information for identifying a user or space 20 that is in such a psychological state to, for example, the service provider. As a result, it is possible for a service provider or the like to provide services appropriate for the psychological state of a user. It is therefore possible to effectively use sensor data to provide services.

For example, information the providing method according to the present embodiment, the processor may further: obtain device activity information indicating an activity status of a device that outputs sound in the home; and when, in addition to (x), (xi) the device activity information indicates that the device that outputs sound is in an inactive state, generate the first information.

This makes it possible to more accurately estimate the psychological state of the user, namely that the user feels uneasy, and provide services more appropriate for the psychological state of the user.

For example, in the information providing method according to the present embodiment, a sensor may be disposed in the home, and the processor may further: obtain current biometric information of the user obtained by the sensor; and when, in addition to (x), (xii) the biometric information indicates that the user feels uneasy, generate the first information.

This makes it possible to more accurately estimate the psychological state of the user, namely that the user feels uneasy, and provide services more appropriate for the psychological state of the user.

For example, in the information providing method according to the present embodiment, the processor may further: obtain weather information for a location of the home; and when, in addition to (x), (xiii) the weather information indicates rain, generate the first information.

This makes it possible to generate the first information on a rainy day, which has a low probability of someone breaking into the home (such as a burglar), and provide services suitable to the situation of space 20 in addition to the psychological state of the user.

The information processing apparatus according to the present embodiment is first information processing apparatus 100 which includes a processor and memory. The processor can: obtain information indicating current sound outside the home obtained by a microphone disposed outside a home; (x) when the information indicating current sound outside the home indicates sound that is different from usual sound outside the home, generate first information indicating that a user feels uneasy about the sound outside the home; obtain, from second information processing apparatus 200 connected to first information processing apparatus 100, information indicating first request content over a network; and when content of the first information is included in the first request content, output, to second information processing apparatus 200, second information including information for identifying the user or the home, using the first information.

Variation 1 of Embodiments 1 and 2

Next, Variation 1 of Embodiments 1 and 2 will be described. The present variation mainly varies from Embodiments 1 and 2 in that services are provided via first information processing apparatus 100. The present variation will be described with reference to the figures, with focus on the differences from Embodiments 1 and 2.

Note that since the configurations of service providing systems 10 and 10A according to the present variation are the same as in Embodiments 1 and 2, repeated illustration and description will be omitted.

Interaction in Service Providing System 10

Figure 16:
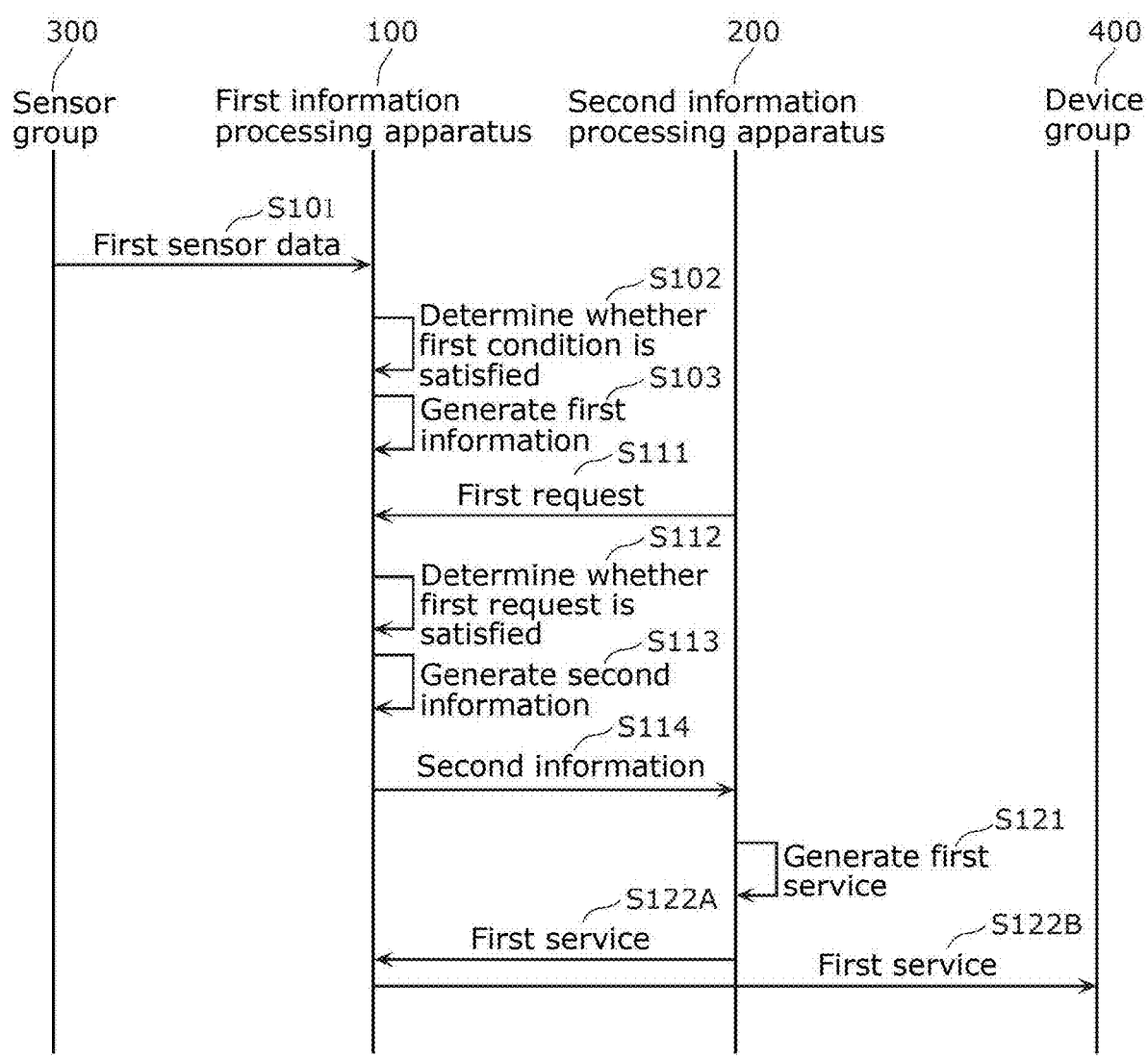
FIG. 16 is a sequence diagram for the service providing system according to Variation 1 of Embodiments 1 and 2.

FIG. 16 is a sequence diagram for service providing system 10 according to Variation 1 of Embodiments 1 and 2. As illustrated in FIG. 16, after generating the first service information (S121), second information processing apparatus 200 according to the present variation outputs the first service information to first information processing apparatus 100 (S122A). First information processing apparatus 100 transfers the first service information obtained from first information processing apparatus 100 to device group 400 (S122B). First information processing apparatus 100 may transmit record information on the provision of the first service information to second information processing apparatus 200. Examples of the record information include the number of times that the first service information has been provided, and attribute information related to a user or space 20. Attribute information is information that cannot identify a user or space 20. Examples of attribute information include geographical information on the user and demographics of the user. Note that the record information may be limited to information that has been permitted to be transmitted by the user in advance.

Advantageous Effects, etc.

As described above, with service providing system 10 according to the present variation, second information processing apparatus 200 can restrict disclosure of information related to space 20 to second information processing apparatus 200 since it is not necessary to directly communicate with device group 400 disposed in space 20. Accordingly, the privacy of users in space 20 can be protected.

Variation 2 of Embodiments 1 and 2

Next, Variation 2 of Embodiments 1 and 2 will be described. The present variation mainly varies from Embodiments 1 and 2 in that the transmission of the first request information from second information processing apparatus 200 to first information processing apparatus 100 is performed before, rather than after, the generation of the first information (S103). The present variation will be described with reference to the figures, with focus on the differences from Embodiments 1 and 2.

Note that since the configurations of service providing systems 10 and 10A according to the present variation are the same as in Embodiments 1 and 2, repeated illustration and description will be omitted.

Interaction in Service Providing System 10

Figure 17:
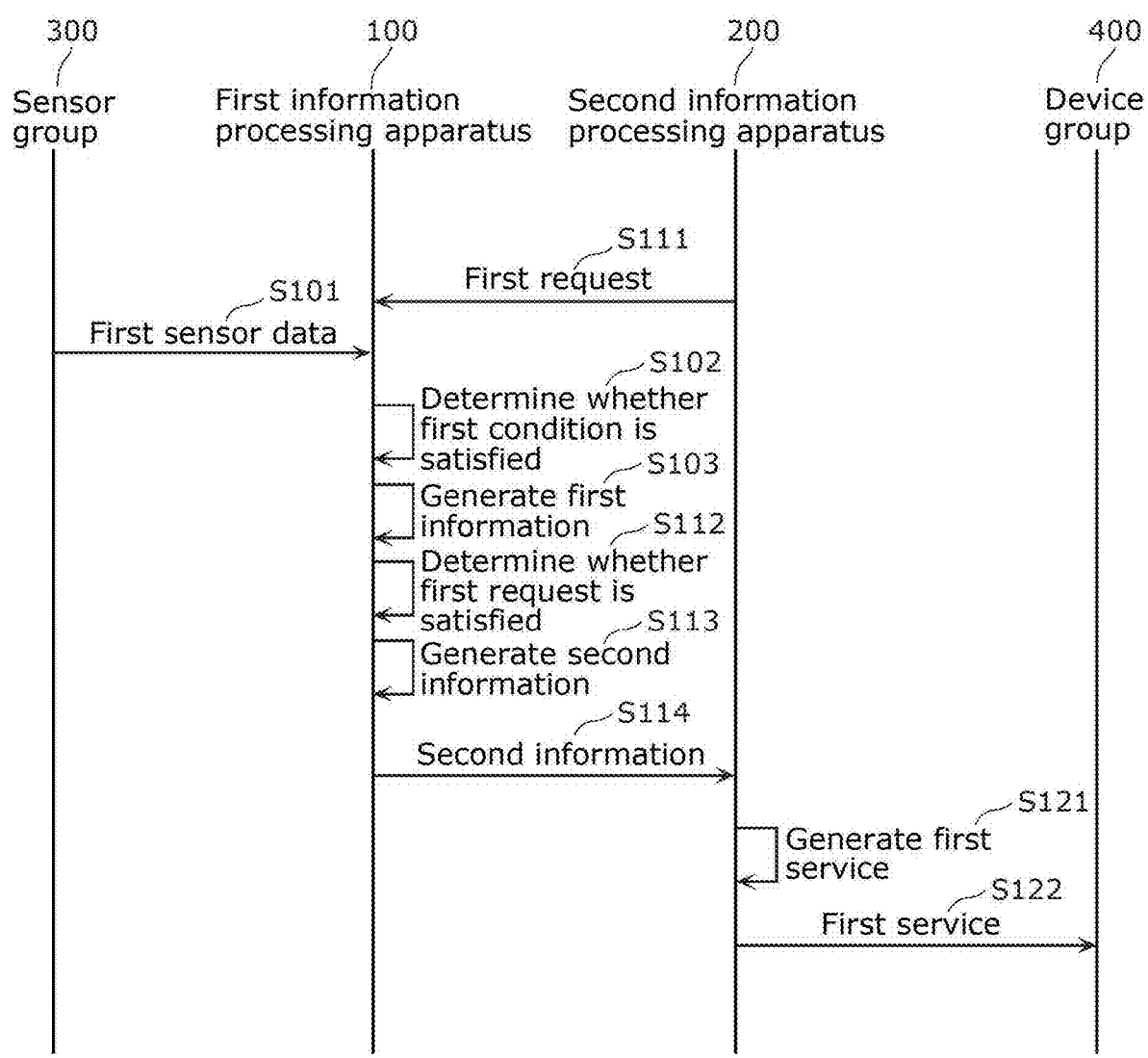
FIG. 17 is a sequence diagram for the service providing system according to Variation 2 of Embodiments 1 and 2.

FIG. 17 is a sequence diagram for service providing system 10 according to Variation 2 of Embodiments 1 and 2. As illustrated in FIG. 17, first information processing apparatus 100 according to the present variation obtains the first request information (S111) before obtaining the first sensor data (S101).

It is sufficient so long as the obtainment of the first request information (S111) is performed before the determining of whether the first request is satisfied (S112); the obtainment of the first request information (S111) is not limited to being performed before the obtainment of the first sensor data (S101). Moreover, since the first request has already been transmitted, second information processing apparatus 200 may request to obtain information regarding when to determine whether the first condition is satisfied (S102). If the first sensor data is consecutively received in a time series and whether the first condition is satisfied or not (S102) is determined upon each instance of reception of the first sensor data, it may be possible to obtain information at the point in time that the situation changes in a way to satisfy the first condition, by obtaining first sensor data information that does not meet the first condition immediately before first data that does satisfy the first condition is received. For example, the second information may be first sensor data information that (i) is obtained immediately before the first condition is satisfied and (ii) does not satisfy the first condition. Moreover, first information processing apparatus 100 may suggest to second information processing apparatus 200 to change the first condition, depending on the result of an analysis of statistical information on the first sensor data information that (i) is obtained immediately before the first condition is satisfied and (ii) does not satisfy the first condition.

Advantageous Effects, etc.

As described above, with service providing system 10 according to the present variation, it is possible to output the second information regardless of the timing of the obtainment of the first request information, and possible to provide second information that is timely.

Variation 3 of Embodiments 1 and 2

Next, Variation 3 of Embodiments 1 and 2 will be described. The present variation mainly varies from Embodiments 1 and 2 in that the second information includes, in addition to information for identifying a user or space, device activity information for a device related to a service. The present variation will be described with reference to the figures, with focus on the differences from Embodiments 1 and 2.

Note that since the configurations of service providing systems 10 and 10A according to the present variation are the same as in Embodiments 1 and 2, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted.

Process for Generating Second Information

Next, the process for generating the second information (S113 in FIG. 8) according to the present variation will be described in greater detail with reference to FIG. 18. FIG. 18 is a flow chart illustrating one example of the process for generating the second information (S113) according to Variation 3 of Embodiments 1 and 2. Note that in the present variation, the first request information includes information for identifying the service provided by second information processing apparatus 200.

First information processing apparatus 100 selects a device related to the service identified by the first request information from among device group 400 disposed in space 20 in which the first information was generated (S1131). For example, first information processing apparatus 100 selects a device from among device group 400 based on the effect the service has on the user's five senses (sight, hearing, smell, touch, and taste) and the effect the device has on the user's five senses.

FIG. 19A illustrates one example of information indicating relationships between services and the five senses. FIG. 19B illustrates one example of information indicating relationships between devices and the five senses. In FIG. 19A and FIG. 19B, a check indicates that the service or device affects the corresponding sense, and a dash indicates that the service or device does not affect the corresponding sense.

For example, FIG. 19A shows that service 1 affects the senses of sight and hearing and does not affect the senses of smell or touch (back, waist, and eyes). For example, FIG. 19B shows that the television affects the senses of sight and hearing and does not affect the senses of smell or touch (back, waist, and eyes).

When, for example, service 1 is identified by the first request information, first information processing apparatus 100 selects, from among the devices illustrated in FIG. 19B, the television and the speaker which are associated with the sense of sight or the sense of hearing that are affected by service 1 as illustrated in FIG. 19A.

Next, first information processing apparatus 100 obtains device activity information for the selected device(s) (S1132). The device activity information is information indicating whether the device is active. For example, the device activity information may be obtained directly from the device(s), or may be obtained via a sensor or sensors.

First information processing apparatus 100 then generates the second information including the device activity information (S1133).

Advantageous Effects, etc.

As described above, according to the present variation, it is possible for the second information to include the device activity information for a device. Accordingly, second information processing apparatus 200 can provide a service that activates a device in an inactive state, and can avoid competition with services for devices that are operating. For example, when there are many devices that are in an active state, second information processing apparatus 200 can avoid causing multiple devices to confuse the senses of the user.

Although the second information includes the device activity information for selected devices in the present variation, this example is non-limiting. For example, the second information may include the device activity information for all devices. Moreover, the device activity information may be output separately from the second information.

The second information may moreover include only device activity information for devices that have been permitted to provide the device activity information by the user. Moreover, when there is a device that has been denied permission to provide the device activity information by the user, the second information may include information indicating that the device has been denied permission to provide the device activity information by the user. For example, when second information processing apparatus 200 provides a service using a device that has been denied permission to provide the operation information by the user, second information processing apparatus 200 may request permission from the user to provide the service.

Variation 4 of Embodiments 1 and 2

Next, Variation 4 of Embodiments 1 and 2 will be described. The present variation mainly varies from Embodiments 1 and 2 in that the second information includes, in addition to information for identifying a user or space, suitability information indicating service provision suitability. The present variation will be described with reference to the figures, with focus on the differences from Embodiments 1 and 2.

Figure 20:
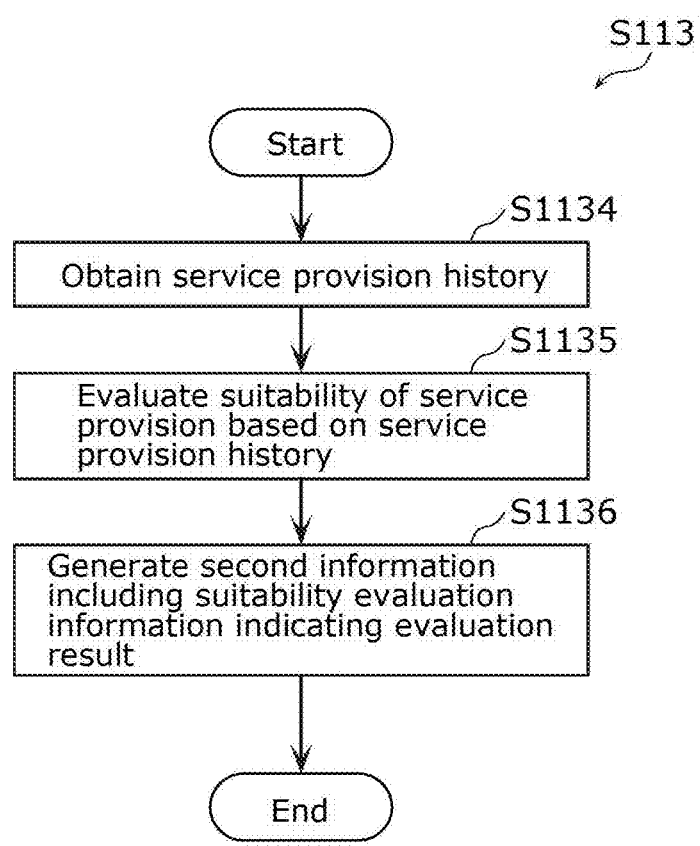
FIG. 20 is a flow chart illustrating one example of the process for generating the second information according to Variation 4 of Embodiments 1 and 2.

Note that since the configurations of service providing systems 10 and 10A according to the present variation are the same as in Embodiments 1 and 2, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted, Process for Generating Second Information Next, the process for generating the second information (S113 in FIG. 8) according to the present variation will be described in greater detail with reference to FIG. 20. FIG. 20 is a flow chart illustrating one example of the process for generating the second information (S113) according to Variation 4 of Embodiments 1 and 2. Note that in the present variation, the first request information includes information for identifying the service provided by second information processing apparatus 200.

First information processing apparatus 100 obtains a service provision history for space 20 or the user (S1134). Service provision history is information associating services provided in the past to space 20 or the user with the date and time that those services were provided.

Figure 21:
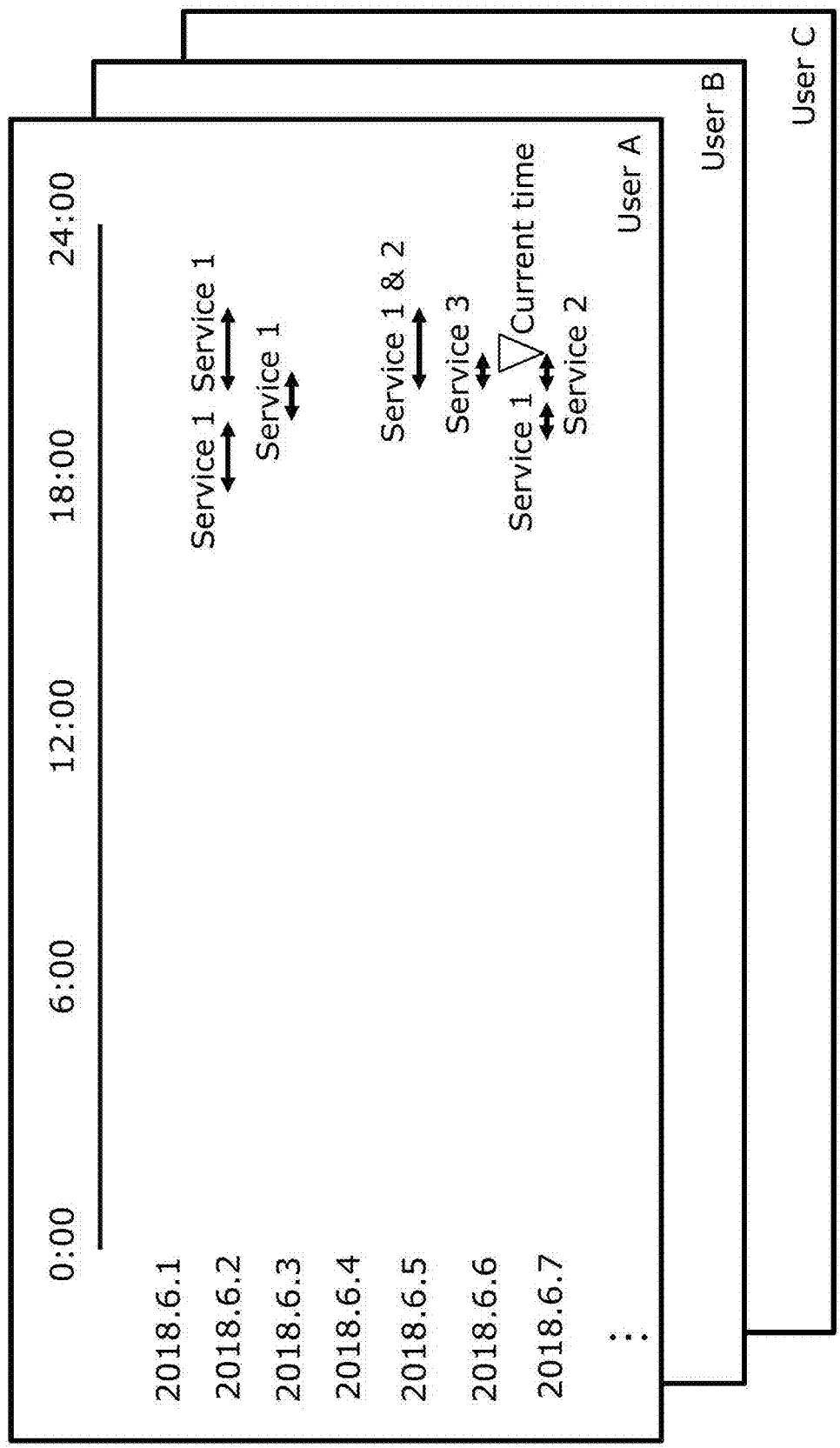
FIG. 21 illustrates one example of the service provision history according to Variation 4 of Embodiments 1 and 2.

FIG. 21 illustrates one example of the service provision history according to Variation 4 of Embodiments 1 and 2. In FIG. 21, time is represented on the horizontal axis, and days are represented on the vertical axis. The double-headed arrows indicate the time that a service was or will be provided to space 20 or the user. For example, service 1 was provided twice between 18:00 and 24:00 on Jun. 2, 2018. Note that the service provision history can include a plurality of different services provided by a plurality of different second information processing apparatuses 200 (in other words, a plurality of different service providers).

Next, first information processing apparatus 100 evaluates the suitability of the provision of the service identified by the first request information for space 20 or the user, based on the obtained service provision history (S1135). More specifically, for example, first information processing apparatus 100 evaluates the suitability of the provision of the service identified by the first request information based on the number of times the service was provided in a given span of time. As another example, first information processing apparatus 100 may evaluate the suitability of the provision of the service identified by the first request information based on another service that is currently being provided.

Next, specific examples of the evaluation of the suitability of the service provision will be given with reference to FIG. 22A through FIG. 22C. FIG. 22A illustrates one example of service provision availability information according to Variation 4 of Embodiments 1 and 2. For example, service provision availability information may be stored in advance in third memory 107, and, alternatively, may be obtained from an external server (not illustrated in the figures).

The service provision availability information indicates, for each service, the number of times per day that service can be provided, as well as situations in which that service cannot be provided. For example, the service provision availability information illustrated in FIG. 22A indicates that service 1 and service 3 both have no restrictions for how many times they can be provided per day, and that service 2 can only be provided once a day.

According to the service provision history illustrated in FIG. 21, on the current day (Jun. 7, 2018), service 1 and service 2 have already been provided. Accordingly, based on the service provision availability information illustrated in FIG. 22A, the suitability of the provision of services 1 and 3 is evaluated high, and the suitability of the provision of service 2 is evaluated low.

Moreover, the service provision availability information illustrated in FIG. 22A indicates that services 1 and 2 cannot be provided in user situations A and B, respectively. For example, a situation in which the user's activity is more delayed than usual may be used as user situations A and B. In such cases, by prohibiting the provision of less urgent services (for example, music playback or providing horoscope information), it is possible to provide services suitable to the user's situation. Moreover, a situation in which the user is in the dining space or entrance space longer than usual may be used as user situations A and B.

FIG. 22B illustrates one example of information indicating services that are prohibited from being provided simultaneously according to Variation 4 of Embodiments 1 and 2. For example, the information indicating services that are prohibited from being provided simultaneously may be stored in advance in third memory 107, and, alternatively, may be obtained from an external server (not illustrated in the figures).

The information indicating services that are prohibited from being provided simultaneously indicates, more specifically, pairs of services that are prohibited from being or allowed to be provided simultaneously. A check indicates the two services are prohibited from being provided simultaneously, while a dash indicates the two services are allowed to be provided simultaneously.

For example, the information illustrated in FIG. 22B indicates that service 1 is allowed to be provided simultaneously with services 2 and 3. In other words, service 1 can be provided along with each of service 2 and service 3. For example, the information illustrated in FIG. 22B also indicates that service 2 is prohibited from being provided simultaneously with service 3. In other words, the information indicates that service 2 cannot be provided along with service 3.

FIG. 22C illustrates one example of information indicating services that are prohibited from being changed according to Variation 4 of Embodiments 1 and 2. For example, the information indicating services that are prohibited from being changed may be stored in advance in third memory 107, and, alternatively, may be obtained from an external server (not illustrated in the figures).

The information indicating services that are prohibited from being changed indicates, more specifically, services prohibited from being or allowed to be provided in place of a service that is already being provided. A check indicates that changing from the service on the left column to the service on the top row is prohibited, and a dash indicates that changing from the service on the left column to the service on the top row is allowed.

For example, in FIG. 22C, when service 1 is currently being provided, changing from service 1 to service 2 is prohibited. On the other hand, when service 2 is currently being provided, changing from service 2 to service 1 is allowed. Moreover, when service 2 is currently being provided, changing from service 2 to service 3 is also prohibited.

In the service provision history illustrated in FIG. 21, service 2 is being provided at the current time. However, based on the information indicating services that are prohibited from being provided simultaneously that is illustrated in FIG. 22B and the information indicating services that are prohibited from being changed that is illustrated in FIG. 22C, the suitability of the provision of service 1 is evaluated high and the suitability of the provision of service 3 is evaluated low.

Such an evaluation result is expressed as two or more levels. For example, two levels, namely "suitable" and "unsuitable", can be used as the evaluation result. As another example, a number score from 0 to 10 or 0 to 100 can be used as the evaluation result.

Lastly, first information processing apparatus 100 generates the second information including suitability evaluation information indicating the evaluation result (S1136).

Advantageous Effects, etc.

As described above, according to the present variation, it is possible for the second information to include suitability evaluation information. Accordingly, second information processing apparatus 200 can, for example, skip the provision of a service when the service's suitability evaluation is low, and can thus inhibit the provision of services at inappropriate times. As a result, service providing systems 10 and 10A can reduce excessive provision of services and inhibit interference between services.

Although the second information includes the suitability evaluation information in the present variation, this example is non-limiting. For example, in addition to or instead of the suitability evaluation information, the second information may include the service provision history information. Moreover, the service suitability information may be output separately from the second information.

Variation 5 of Embodiments 1 and 2

Next, Variation 5 of Embodiments 1 and 2 will be described. The present variation mainly varies from Embodiments 1 and 2 in that, when first requests having the same request content have already been received from a plurality of second information processing apparatuses 200 (see Variation 2 above), the second information is output to a second information processing apparatus 200 selected based on priority level. The present variation will be described with reference to the figures, with focus on the differences from Embodiments 1 and 2.

Note that since the configurations of service providing systems 10 and 10A according to the present variation are the same as in Embodiments 1 and 2, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted.

Process for Outputting Second Information

Figure 23:
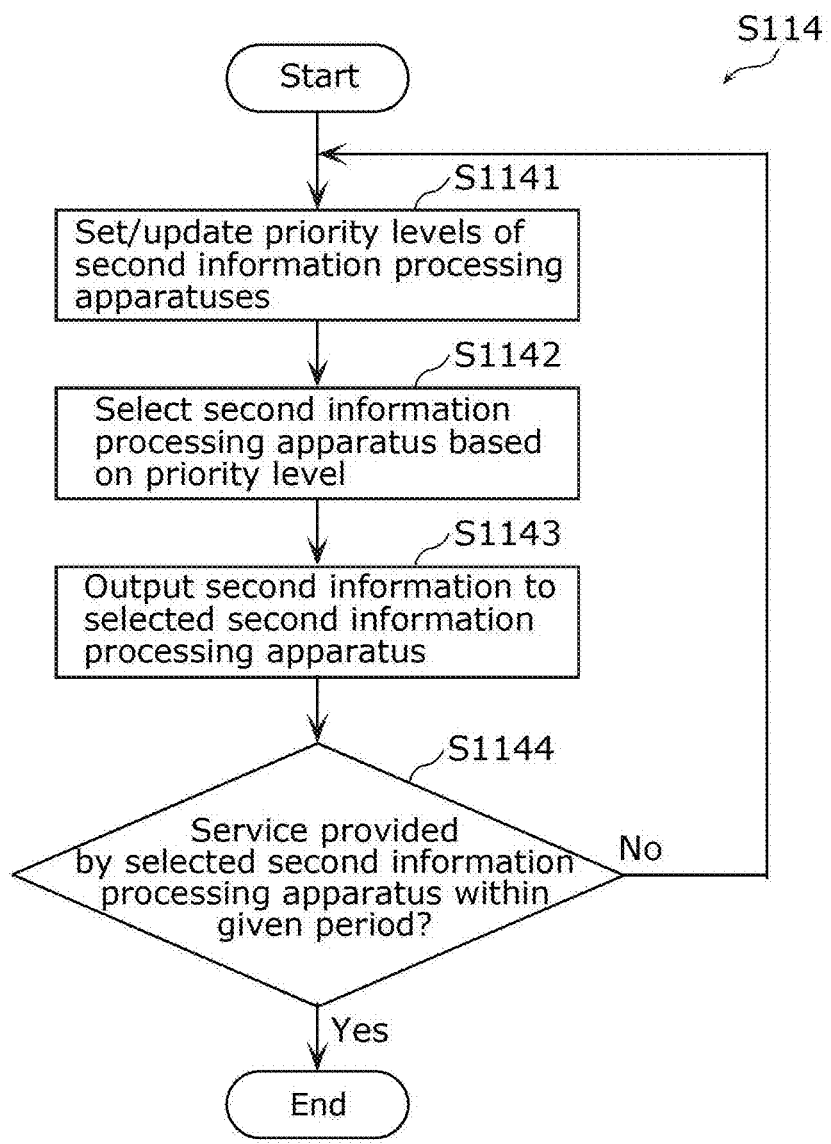
FIG. 23 is a flow chart illustrating one example of the process for outputting the second information according to Variation 5 of Embodiments 1 and 2.

Next, the process for outputting the second information (S114 in FIG. 8) according to the present variation will be described in greater detail with reference to FIG. 23. FIG. 23 is a flow chart illustrating one example of the process for outputting the second information (S114) according to Variation 5 of Embodiments 1 and 2.

First information processing apparatus 100 sets the priority level of each of a plurality of second information processing apparatuses 200 (S1141). In other words, first information processing apparatus 100 sets the priority level for each of a plurality of second information processing apparatuses 200 that correspond to a plurality of first requests having the same request content. For example, the priority levels may be included in the first request information, and in such cases, the priority levels are set according to the priority levels included in the first request information. The priority levels may be set according to the situation of space 20 or the user that is obtained from sensor group 300 and device group 400. Moreover, the priority levels of the plurality of second information processing apparatuses 200 may be set based on bid amounts by the service providers for the provision of the second information.

Next, first information processing apparatus 100 selects one or more second information processing apparatuses 200 based on the set priority level (S1142). For example, first information processing apparatus 100 selects, from among a plurality of second information processing apparatuses 200 that correspond to a plurality of first requests having the same request content, the second information processing apparatus 200 having the highest priority level. Note that the number of second information processing apparatuses 200 selected is not limited to one.

First information processing apparatus 100 then outputs the second information to the selected second information processing apparatus 200 (S1143). Thereafter, first information processing apparatus 100 determines whether the service has been provided by the selected second information processing apparatus 200 within a given period (S1144). In other words, whether or not the selected second information processing apparatus 200 has provided the service within a given period starting when the second information is output is determined. An empirically or experimentally predefined period can be used as the given period. For example, the same period may be used across a plurality of services. Alternatively, individually set times for the plurality of services may be used as the given period.

When the service is provided within the given period (Yes in S1144), processing ends. However, when the service is not provided within the given period (No in S1144), processing proceeds to step S1141. This time in step S1141, the priority levels of the plurality of second information processing apparatuses 200 are updated such that the priority level of the second information processing apparatus 200 that did not provide the service is reduced. First information processing apparatus 100 then selects one or more second information processing apparatuses 200 based on the updated priority levels (S1142). Here, the system may be configured so that the service can only be provided to the user or space 20 when the priority level is set to the highest level. For example, if the second information is sent to both the second information processing apparatus 200 set to the highest priority level before the update and the second information processing apparatus 200 set to the highest priority level after the update, there is a chance that the service may be redundantly provided when, after a given period, the service is attempted to be provided by the second information processing apparatus 200 set to the highest priority level before the update. Accordingly, the system may be set so that only the second information processing apparatus 200 set to the highest priority level can use the second information. For example, this may be achieved by setting the system so that the second information may only be used at the time the service is executed, so that the encryption is changed after each update, and providing an encryption key corresponding to the second information processing apparatus 200 set to the highest priority level.
Advantageous Effects, etc.

As described above, according to the present variation, first information processing apparatus 100 can select a second information processing apparatus 200 based on priority level. Accordingly, service providing systems 10 and 10A can select a second information processing apparatus 200 that is appropriate for the provision of the service from among a plurality of second information processing apparatuses 200 corresponding to a plurality of first requests having the same request content.

Embodiment 3

Figure 24A:
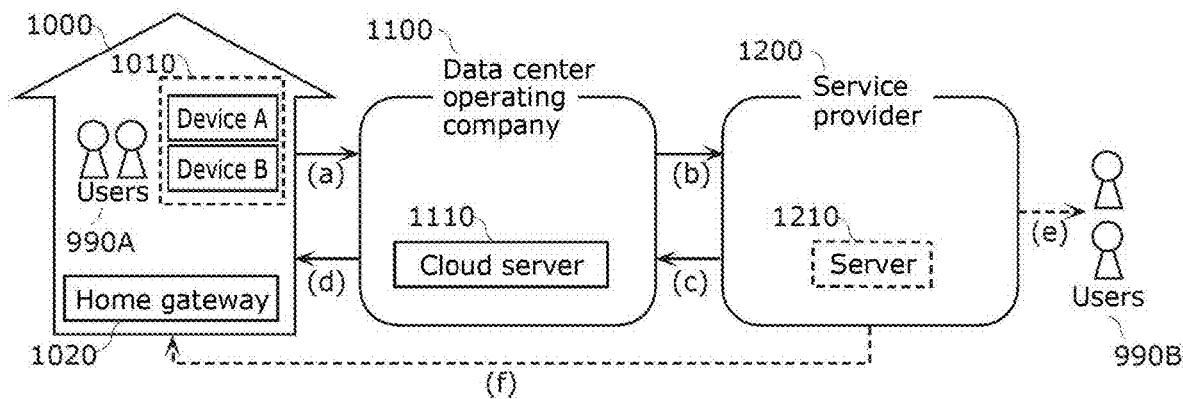
FIG. 24A illustrates an overview of the service providing system according to Embodiment 3.

Next, Embodiment 3 will be described. In the present embodiment, the types of services in the service providing system will be described.
Overview of Provided Services FIG. 24A illustrates an overview of the service providing system according to Embodiment 3.

Group 1000 is, for example, a business, an organization, or a household or the like. The scale of group 1000 may be any scale. Group 1000 includes devices A and B included in plural devices 1010, and home gateway 1020, For example, plural devices 1010 are devices included in device group 400 according to Embodiment 1 described above. For example, home gateway 1020 is gateway 500 according to Embodiment 1 described above. Plural devices 1010 include devices that can connect to the internet (for example, smartphones, PCs, televisions, etc.) as well as devices that cannot connect to the internet themselves (for example, lights, washing machines, etc.). Even devices that cannot connect to the internet themselves but can connect to the internet via home gateway 1020 may be included. Moreover, user(s) 990A that use plural devices 1010 are in group 1000.

Figure 24B:
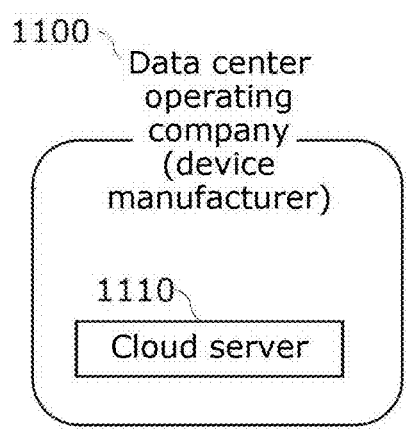
FIG. 24B illustrates one example of a data center operating company according to Embodiment 3.
Figure 24C:
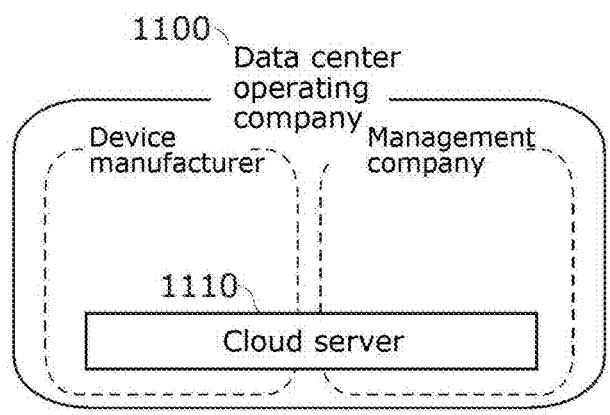
FIG. 24C illustrates one example of a data center operating company according to Embodiment 3.

Data center operating company 1100 includes cloud server 1110. Cloud server 1110 is a virtual server that links with various devices over the internet. For example, cloud server 1110 is first information processing apparatus 100 according to Embodiment 1 described above. For example, cloud server 1110 manages big data which is difficult to manage with typical database management tools. Data center operating company 1100 performs operations of a data center, such as data management and management of cloud server 1110. Services performed by data center operating company 1100 will be described in greater detail later. Here, data center operating company 1100 is not limited to a company that only performs operations such as data management and operation of cloud server 1110. For example, when a device manufacturer that develops and produces one device among plural devices 1010 also performs data management and management of cloud server 1110, that device manufacturer corresponds to data center operating company 1100 (FIG. 24B). Moreover, data center operating company 1100 is not limited to a single company. For example, when a device manufacturer and another management company work in consort or through shared contribution to carry out the data management and operation of cloud server 1110, both or one of the device manufacturer and the management company corresponds to data center operating company 1100 (FIG. 24C).

Service provider 1200 has server 1210. As used herein, the scale of server 1210 may be any scale. For example, server 1210 may be memory included in a personal computer. Moreover, there are cases in which service provider 1200 does not have server 1210. For example, server 1210 is second information processing apparatus 200 according to Embodiment 1 described above.

Note that home gateway 1020 is not required in the service described above. For example, when cloud server 1110 does all of the data management, home gateway 1020 is not necessary. Furthermore, there are cases in which there are no devices that cannot connect to the internet themselves, such as when all household devices are connected to the internet.

Next, the flow of information in the above service will be described.

First, device A and device B in group 1000 transmit information they obtained to cloud server 1110 in data center operating company 1100. Cloud server 1110 accumulates the information from device A or device B ((a) in FIG. 24A). The accumulated information is information indicating, for example, the operation status, operating date and time, operation mode, position, etc., of plural devices 1010. Examples include, but are not limited to, television viewing history, television video recorder scheduled recordings, washing machine operating date and time, washing machine laundry amount, date and time that the door of a refrigerator opened or closed, number of times that the door of a refrigerator opened or closed, and amount of food in a refrigerator; the accumulated information includes any information that can be obtained from any kind of device. There are cases in which the information is provided directly to cloud server 1110 from plural devices 1010 themselves via the internet. The information may be obtained from plural devices 1010 and intermediately accumulated by home gateway 1020, from where it is provided to cloud server 1110.

Next, cloud server 1110 in data center operating company 1100 provides the accumulated information to service provider 1200 in fixed units. Here, fixed units may be units in which the data center operating company can organize the collected information and provide the collected information to service provider 1200, and may be units requested by service provider 1200. Although the term "fixed units" is used herein, the units need not be fixed; the amount of information provided may be variable according to the situation. The information is stored in server 1210 of service provider 1200 ((b) in FIG. 24A). Service provider 1200 then organizes the information to suit the service to be provided to the user, and then provides it to the user. The user on the receiving end may be user 990A that uses plural devices 1010, and may be external user(s) 990B. The method of providing the service to the user may be a method whereby the service is provided directly from the service provider, for example ((e), (f) in FIG. 24A). Alternatively, the method of providing the service to the user may be a method whereby the service is provided to the user via cloud server 1110 in data center operating company 1100 ((c), (d) in FIG. 24A). Moreover, cloud server 1110 in data center operating company 1100 may organize the information to suit the service to be provided to the user, and then provide the information to service provider 1200.

Note that user 990A and user 990B may be the same or different users.

For example, the techniques described above can be realized in the following types of cloud services. However, the techniques described above are not limited to being realized in the following examples.

Service Type 1: In-company Data Center

Figure 25:
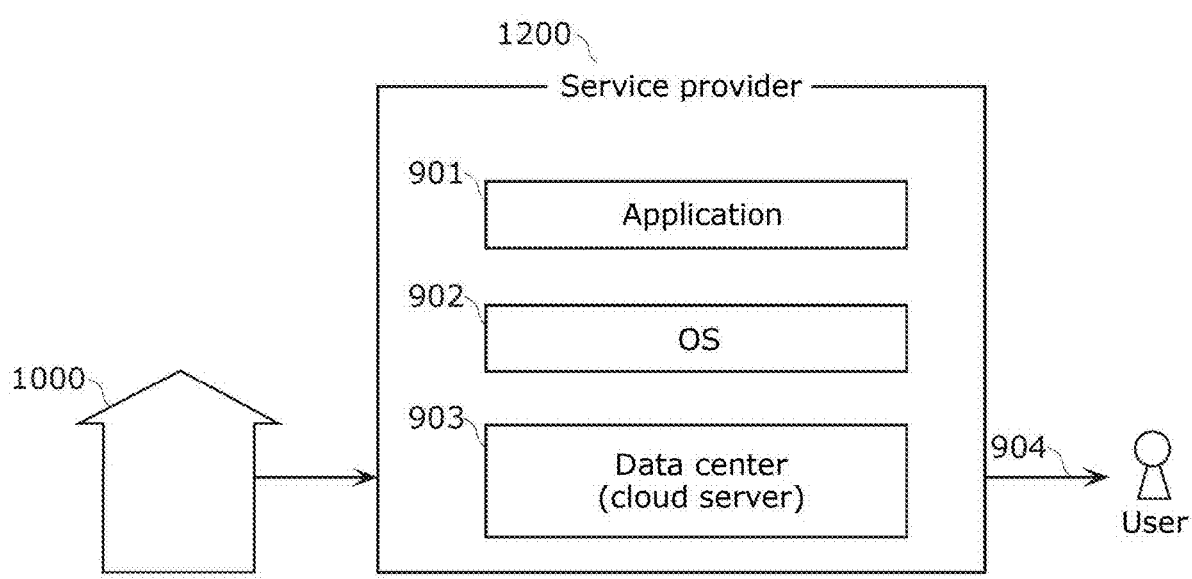
FIG. 25 illustrates service type 1 (in-company data center) according to Embodiment 3.

FIG. 25 illustrates service type 1 (in-company data center). In this type, service provider 1200 obtains information from group 1000 and provides a service to a user. In this type, service provider 1200 functions as a data center operating company. In other words, the service provider has cloud server 1110 that manages big data. Accordingly, there is no data center operating company.

In this type, service provider 1200 operates and manages data center 903 (cloud server 1110). Service provider 1200 also manages OS 902 and application 901. Service provider 1200 provides service 904 using OS 902 and application 901 that it manages.

Service Type 2: IaaS

Figure 26:
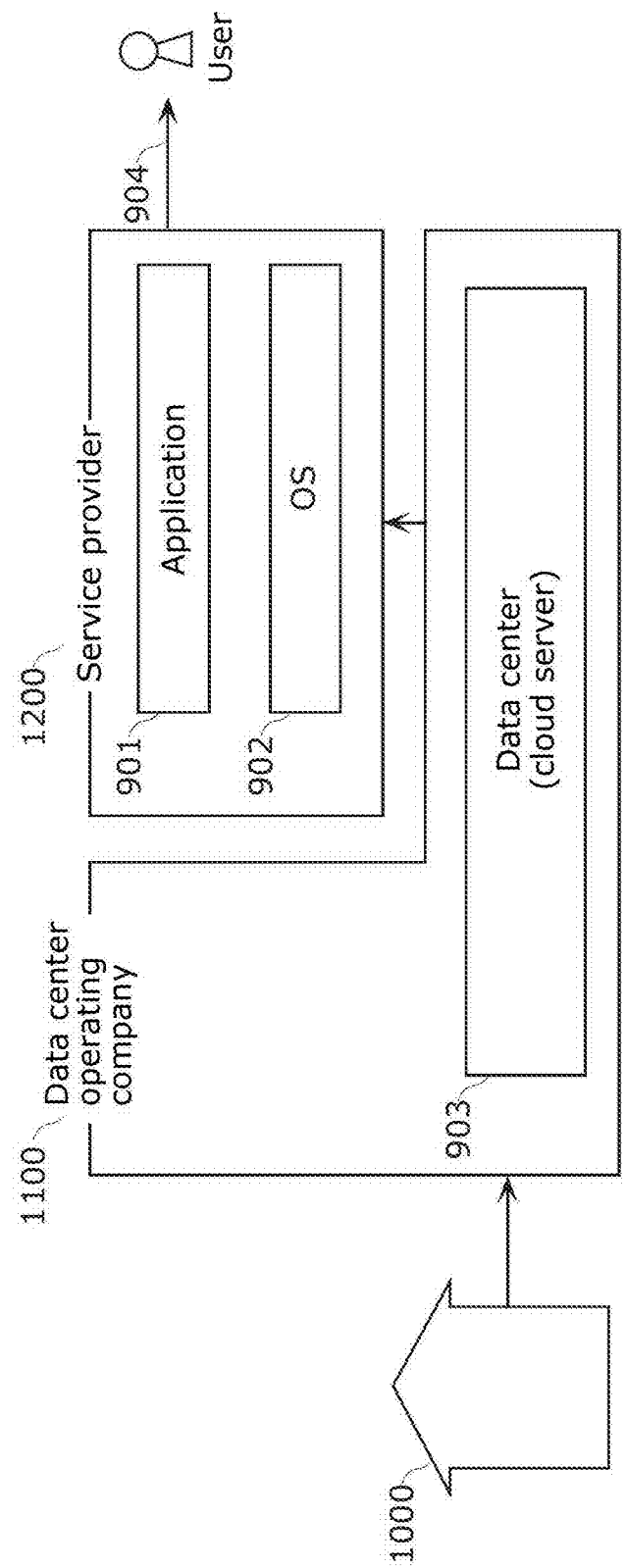
FIG. 26 illustrates service type 2 (IaaS) according to Embodiment 3.

FIG. 26 illustrates service type 2 (IaaS). As used herein, "IaaS" stands for infrastructure as a service, and refers to a cloud service provision model that provides an infrastructure for constructing and operating a computer system, as a service via the Internet.

In this type, data center operating company 1100 operates and manages data center 903 (cloud server 1110). Service provider 1200 also manages OS 902 and application 901. Service provider 1200 provides service 904 using OS 902 and application 901 that itself manages.

Service Type 3: PaaS

Figure 27:
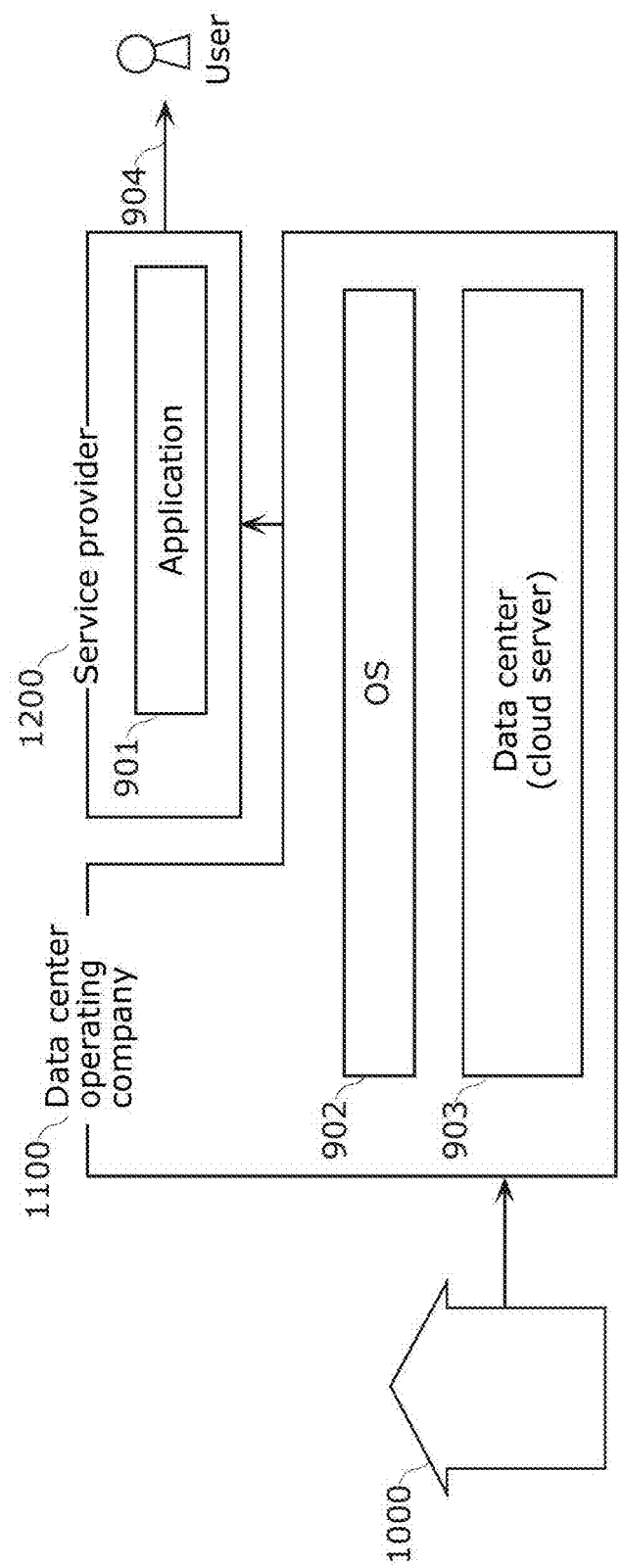
FIG. 27 illustrates service type 3 (PaaS) according to Embodiment 3.

FIG. 27 illustrates service type 3 (PaaS). As used herein, "PaaS" stands for platform as a service, and refers to a cloud service provision model that provides a platform for constructing and operating software, as a service via the Internet.

In this type, data center operating company 1100 manages OS 902 and operates and manages data center 903 (cloud server 1110). Service provider 1200 also manages application 901. Service provider 1200 provides service 904 using OS 902 managed by the data center operating company and application 901 that itself manages.

Service Type 4: SaaS

Figure 28:
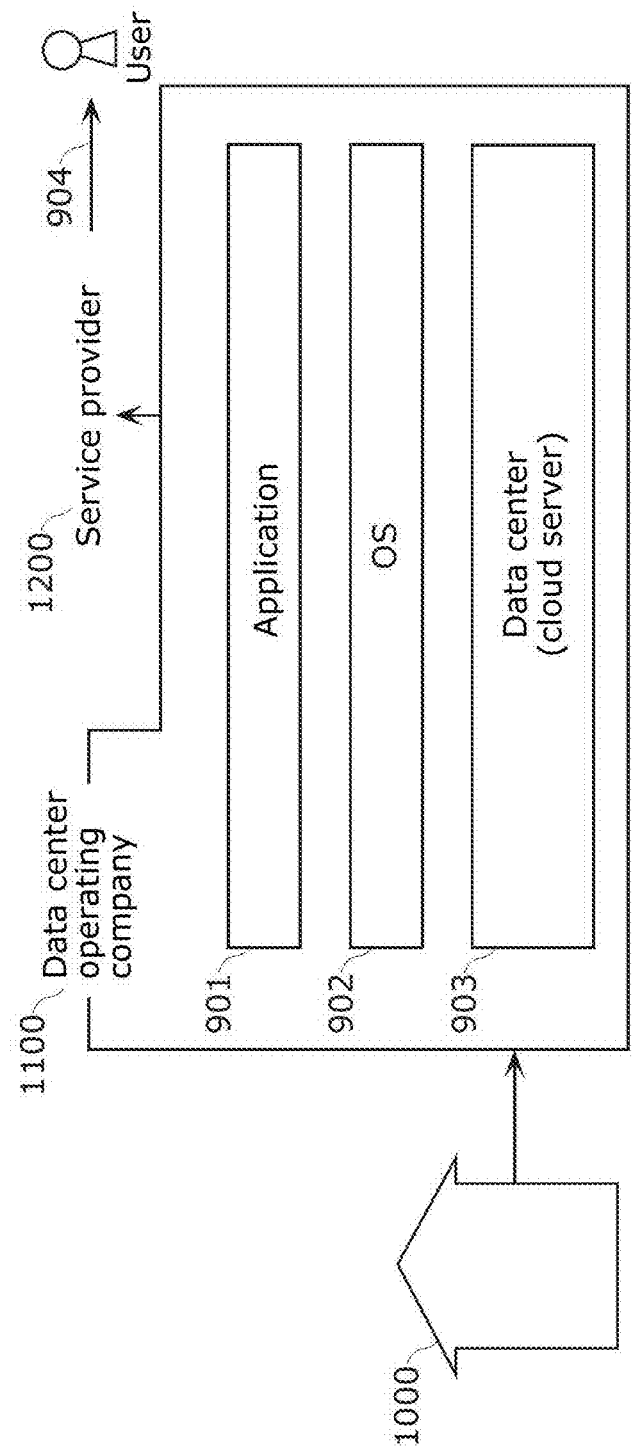
FIG. 28 illustrates service type 4 (SaaS) according to Embodiment 3.

FIG. 28 illustrates service type 4 (SaaS). As used herein, "SaaS" stands for software as a service. For example, SaaS refers to a cloud service provision model that, for example, has a function that allows a company or individual (user) that does not have a data center (cloud server) to use, over a network such as the internet, an application provided by a platform provider that has a data center (cloud server).

In this type, data center operating company 1100 manages application 901, manages OS 902, and operates and manages data center 903 (cloud server 1110). Service provider 1200 provides service 904 using OS 902 and application 901 that data center operating company 1100 manages.

In any of the above types, the service provision is performed by service provider 1200. Moreover, for example, the service provider or the data center operating company may develop, for example, the OS, application, or database of big data themselves, or may outsource the OS, application, or database of big data from a third party.

Other Embodiments

Although the service providing system according to one or more aspects of the present disclosure has been described based on embodiments, the present disclosure is not limited to these embodiments. Those skilled in the art will readily appreciate that various modifications may be made in these exemplary embodiments and that other embodiments may be obtained by arbitrarily combining the elements of the embodiments without materially departing from the novel teachings and advantages of the subject matter of the present disclosure. Accordingly, all such modifications and other embodiments are included in one or more aspects of the present disclosure.

For example, in the embodiments above, first information processing apparatus 100 that processes the sensor data and second information processing apparatus 200 that generates the service information are provided as separate apparatuses, but first information processing apparatus 100 and second information processing apparatus 200 may be configured as a single information processing apparatus. In such cases, since there is no need for interaction between first information processing apparatus 100 and second information processing apparatus 200, when the first condition is satisfied, processes from the generation of the first information to the output of the second information may be skipped. Similarly, when the second condition is satisfied, processes from the generation of the third information to the output of the fourth information may be skipped. For example, when the first condition is satisfied, an audio device can be caused to output a given piece of music, and when the second condition is satisfied, the volume of the given piece of music being output by the audio device can be lowered.

INDUSTRIAL APPLICABILITY

The techniques of the present disclosure can be used as an information processing apparatus that provides information for providing a service to a user.

The invention claimed is:

1. An information providing method that uses a first information processing apparatus which includes a processor and memory,
wherein a luminaire, an audio device that outputs sound, and a sensor are disposed in a space, and
the processor, in operation:
obtains presence information indicating whether a user is present in the space, based on a first sensor value of the sensor;
obtains past lighting information indicating a period in the past in which the luminaire emitted light;
obtains current lighting information indicating whether the luminaire is currently emitting light;
obtains operating status information indicating whether the audio device is outputting sound;
when (i) the presence information indicates that the user is present in the space, (ii) the current lighting information indicates that the luminaire is currently emitting light, (iii) a current time is not included in a period indicated in the past lighting information, and (iv) the operating status information indicates that the audio device is not outputting sound, generates first information indicating that the user is in the space at a time at which the user is not usually in the space;

obtains, from a second information processing apparatus connected to the first information processing apparatus, information indicating first request content over a network; and when content of the first information is included in the first request content, outputs, to the second information processing apparatus, second information including information for identifying the user or the space, using the first information.

2. The information providing method according to claim 1,
wherein a refrigerator is further disposed in the space, and
the processor:
obtains door information indicating whether a door of the refrigerator is open or closed; and
when, in addition to (i) through (iv), (v) the door information indicates that the door of the refrigerator was opened or closed within a given period from the current time, generates the first information.

3. The information providing method according to claim 1,
wherein a sound collection apparatus that collects sound is further disposed in the space, and
the processor further:
obtains sound information collected by the sound collection apparatus; and
when, in addition to (i) through (iv), (vi) the sound information includes, within a given period from the current time, a sound of a container containing a beverage being opened or a sound of a wrapper of a food product being opened, generates the first information.

4. The information providing method according to claim 1,
wherein the processor:
when, in addition to (i) through (iv), (vii) the current time is included in a given period at night, generates the first information.

5. The information providing method according to claim 1,
wherein the sensor is a motion sensor, and
the processor:
obtains a second sensor value from the motion sensor after generating the first information;
when, based on the second sensor value, an amount of movement of the user is less than or equal to a given amount, generates third information indicating that the user is in the space at a time at which the user is not usually in the space and that the amount of movement is decreasing;
obtains, from the second information processing apparatus, information indicating second request content over the network; and
when content of the third information is included in the second request content, outputs, to the second information processing apparatus, fourth information including information for identifying the user or the space, using the third information.

6. An information providing method that uses a first information processing apparatus which includes a processor and memory,
wherein a device is disposed in a space, and
the processor:
obtains past user-operation information indicating an operation period in which the device was operated in the past;
obtains current user-operation information indicating whether the device was operated within a given period from a current time;
when (viii) the current user-operation information indicates that the device was operated within the given period from the current time and (ix) the current time is not included in an operation period indicated in the past user-operation information, generates first information indicating that a user is in the space at a time at which the user is not usually in the space;
obtains, from a second information processing apparatus connected to the first information processing apparatus, information indicating first request content over a network; and
when content of the first information is included in the first request content, outputs, to the second information processing apparatus, second information including information for identifying the user or the space, using the first information.

7. A control method of an audio device that uses an information processing apparatus including a processor and memory,
wherein a luminaire, an audio device that outputs sound, and a sensor are disposed in a space, and
the processor:
obtains presence information indicating whether a user is present in the space, based on a first sensor value of the sensor;
obtains past lighting information indicating a period related to time of day in the past in which the luminaire emitted light;
obtains current lighting information indicating whether the luminaire is currently emitting light;
obtains operating status information indicating whether the audio device is outputting sound; and
when (i) the presence information indicates that the user is present in the space, (ii) the current lighting information indicates that the luminaire is currently emitting light, (iii) a current time is not included in the period indicated in the past lighting information, and (iv) the operating status information indicates that the audio device is not outputting sound, causes the audio device to output a given piece of music.

8. The control method according to claim 7,
wherein the sensor is a motion sensor, and
the processor:
obtains a second sensor value from the motion sensor after causing the audio device to output the given piece of music; and
when, based on the second sensor value, an amount of movement of the user is less than or equal to a given amount, lowers a volume of the given piece of music output by the audio device.

* * * * *